United States Patent [19]
Yasukawa et al.

[11] Patent Number: 4,736,436
[45] Date of Patent: Apr. 5, 1988

[54] INFORMATION EXTRACTION BY MAPPING

[75] Inventors: Yusuke Yasukawa, Yokohama; Susumu Kawakami, Tama; Takashi Uchiyama, Kawasaki; Yasushi Inamoto, Tokyo, all of Japan

[73] Assignee: Fujitsu Limited, Kawasaki, Japan

[21] Appl. No.: 721,571

[22] Filed: Apr. 9, 1985

[30] Foreign Application Priority Data

Apr. 13, 1984 [JP] Japan .................. 59-074518
Apr. 13, 1984 [JP] Japan .................. 59-074519

[51] Int. Cl.$^4$ .............................................. G06K 9/46
[52] U.S. Cl. ..................................... 382/16; 364/725; 382/23; 382/56
[58] Field of Search ........................... 382/16, 23, 56; 364/725, 729, 730, 731, 815, 817, 826, 455; 358/22, 233, 292, 104; 434/40, 43, 44

[56] References Cited

U.S. PATENT DOCUMENTS

| | | | |
|---|---|---|---|
| 3,952,187 | 4/1976 | Robinson et al. | 364/731 |
| 4,241,412 | 12/1980 | Swain | 364/731 |
| 4,276,561 | 6/1981 | Friedman | 358/292 |
| 4,306,296 | 12/1981 | Blaschke | 364/815 |
| 4,451,856 | 5/1984 | Buechler | 358/292 |
| 4,489,389 | 12/1984 | Beckwith et al. | 364/731 |
| 4,500,972 | 2/1985 | Kuhn et al. | 364/731 |

Primary Examiner—Leo H. Boudreau
Attorney, Agent, or Firm—Staas & Halsey

[57] ABSTRACT

An information extraction device including a coordinate transformation unit for transforming the coordinate values of points on a plane in question to the coordinate values of the points on a spherical surface corresponding to the points on the plane, and a mapping unit for mapping the points on the spherical surface to great circles. This information extraction device is applicable to the detection of the three-dimensional direction of a single line or a single plane existing in space.

28 Claims, 45 Drawing Sheets

PART-1

PART-2

PART-3

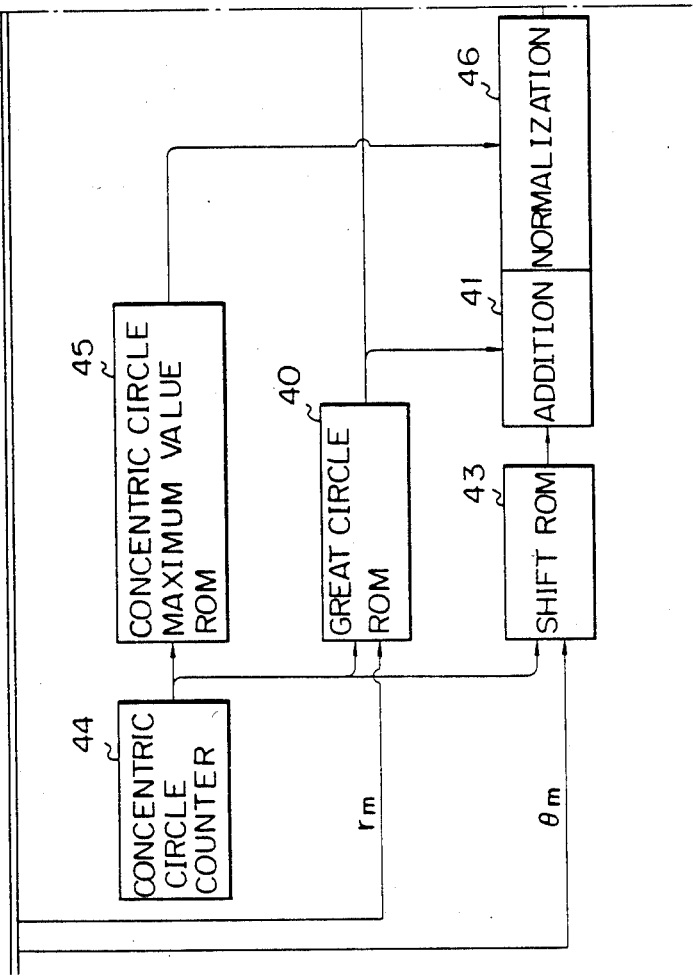

| Fig. 20 A | Fig. 20 B |

Fig. 33
$X_l$ THROUGH $X_n$
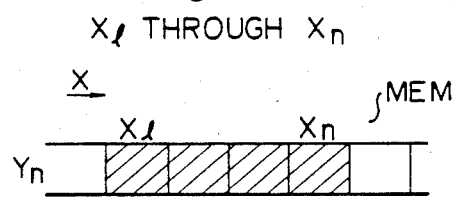
$X_l$ AND $X_n$
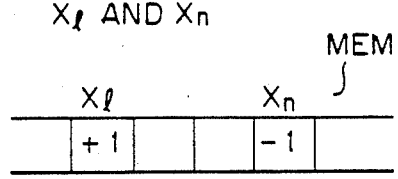
RESULT OF INTEGRATION
Fig. 34
$X_l$ THROUGH $X_{n-1}$ AND $X_{l+1}$ THROUGH $X_n$
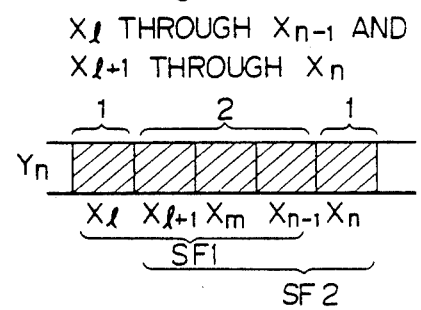
$X_l$, $X_{l+1}$, $X_{n-1}$, AND $X_n$
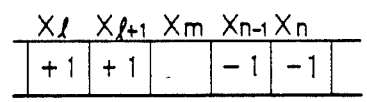
RESULT OF INTEGRATION
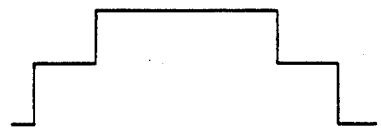

Fig. 35
PART-1
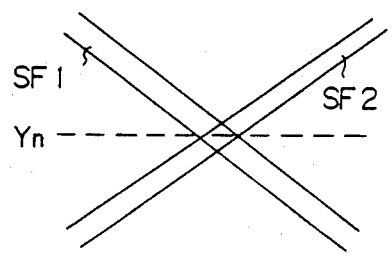
PART-2
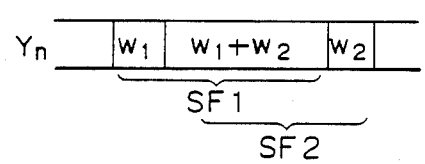
PART-3
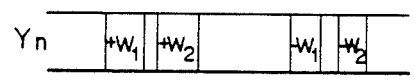

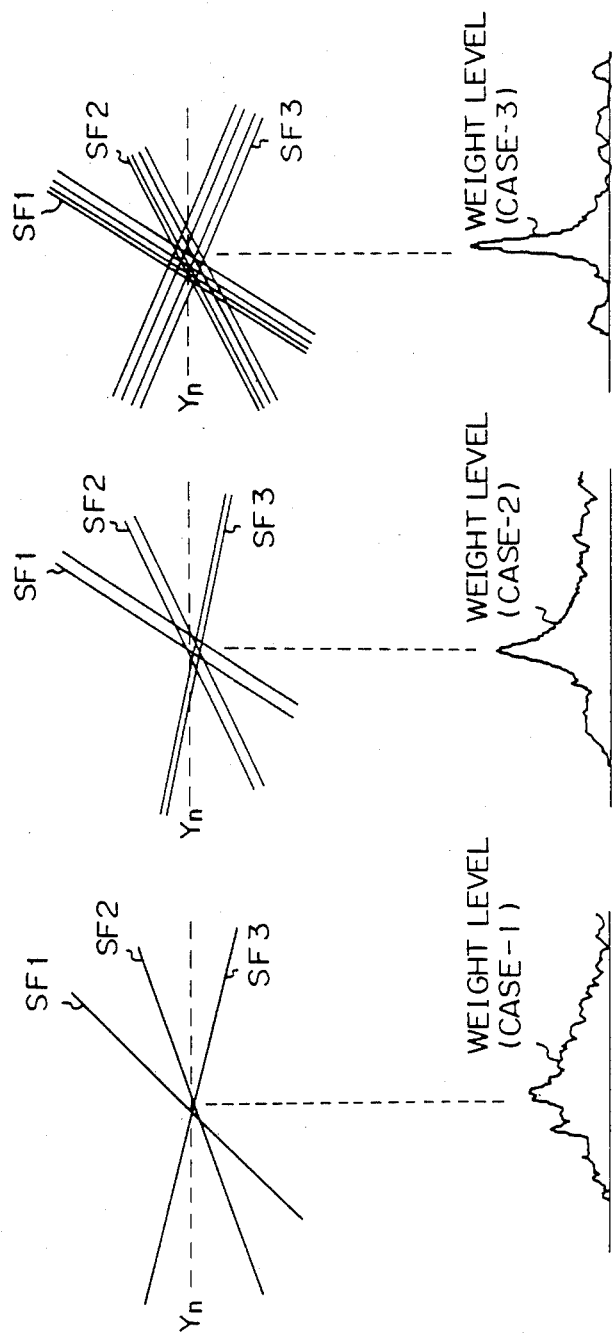

Fig. 38
PART-1
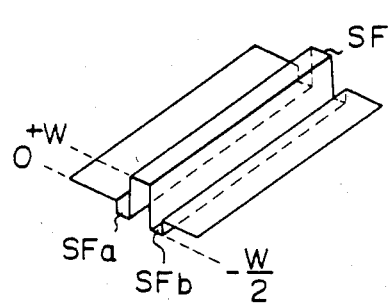
PART-2
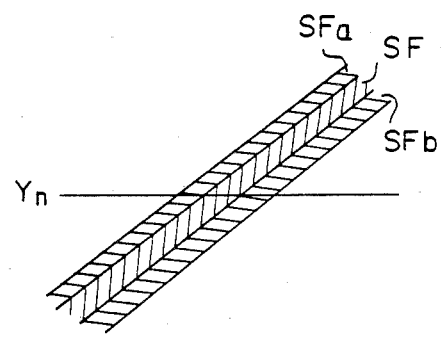
PART-3
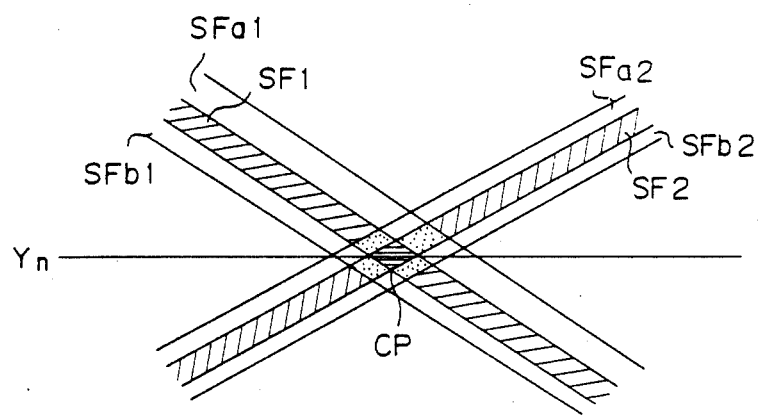

Fig. 39
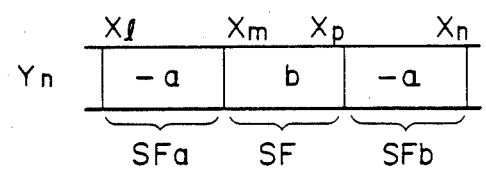
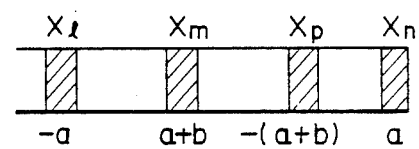
Fig. 40
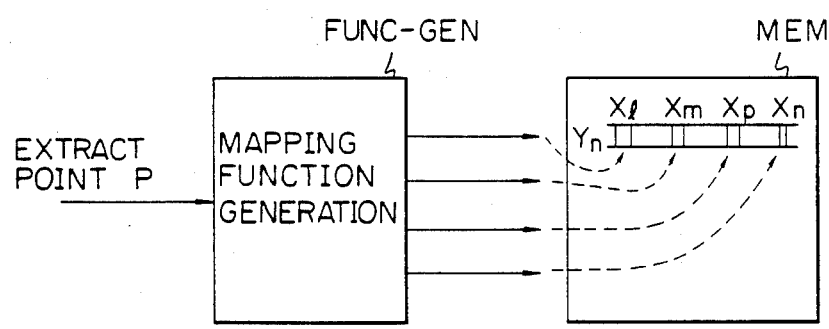

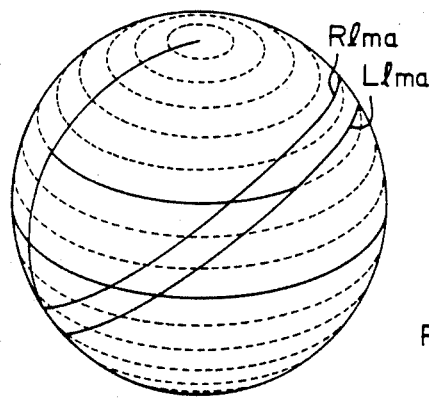
Fig. 41A
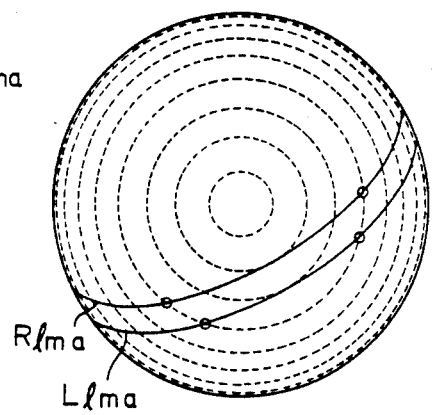
Fig. 41B
Fig. 43
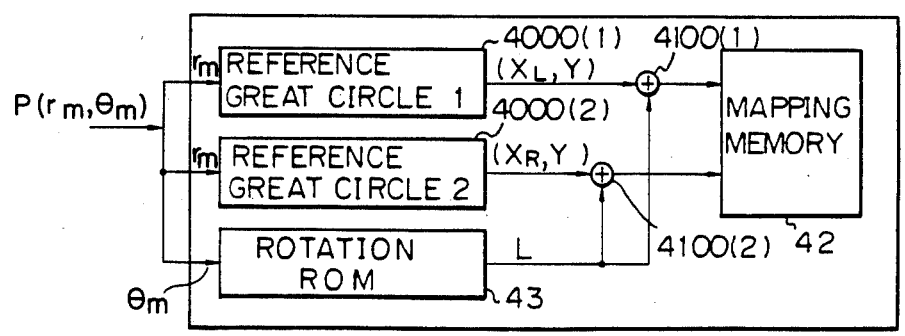

PART-1

PART-2

PART-3

PART-4

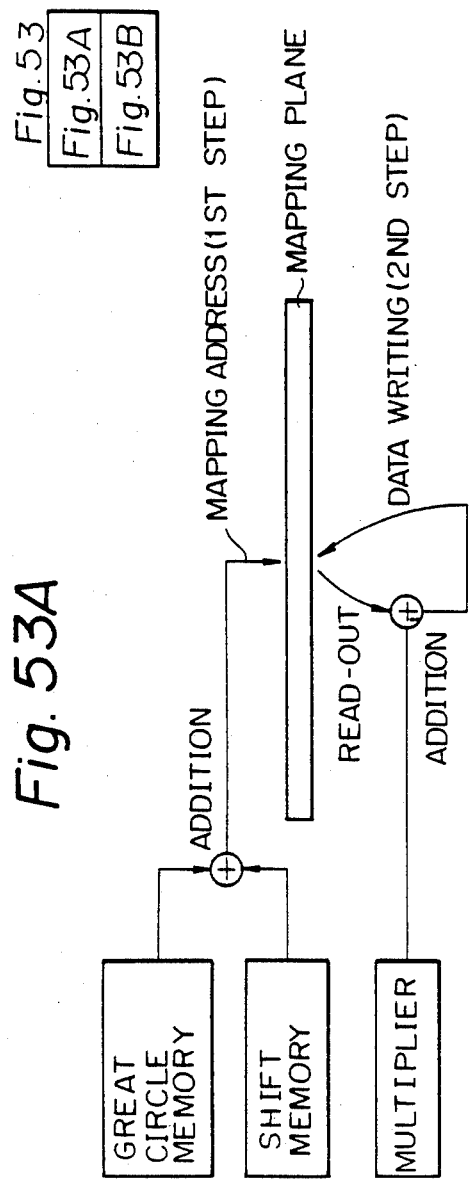

| PROGRAM "CLEAR" | CLEAR MAPPING PROCESSOR COMPLETION OF EXECUTION OF CLEAR |
|---|---|
| PROGRAM "MAP" | SUPPLY DATA FOR MAPPING AND MAPPING COMMAND WRITE DIFFERENTIATION VALUE OF GREAT CIRCLE COMPLETION OF EXECUTION |
| PROGRAM "INTEG" | SUPPLY MAPPING PROCESSOR WITH INTEGRATION COMMAND EXECUTE INTEGRATION COMPLETION OF EXECUTION OF INTEGRATION |

INFORMATION EXTRACTION BY MAPPING

BACKGROUND OF THE INVENTION

The present invention relates to an information extraction device for extracting information of a picture by means of mapping. The device according to the present invention can be used to obtain information concerning a picture, such as the existence of a straight line, the intersection of straight lines, and the three-dimensional direction of straight lines or parallel lines. Such information is useful for pattern recognition of an object, such as in the case of pattern recognition by an industrial robot.

In general, in order to obtain pattern information of an object article, an image of the object is taken by an imaging device, such as a TV camera, the image is processed electronically, and information is extracted from the result of the image processing.

One of the prior art methods of the information extraction is the Hough transformation method, in which the probability of extraction of a straight line or a line segment in the image from the object is enhanced.

In the Hough transformation method, the coordinates of a point $(x_i, y_i)$ in the x-y plane of the image plane are transformed into a mapping function in the form of a sine wave: $r = x_i \cos\theta + y_i \sin\theta$, in the $\theta - r$ plane of the parameter plane.

The sine waves, which correspond to points on a straight line in the picture plane, intersect at two points in the parameter plane. If only the positive value of $\rho$ is taken into consideration, the above-mentioned sine waves intersect at a single point. The angle $\theta_0$ and the height $r_0$ of the intersecting point in the parameter plane indicate the length of the vertical line from the original point to the straight line and the angle of the vertical line in the image plane. Hence, information of the straight line on the image plane can be extracted by using the obtained data of the angle $\theta_0$ and the height $r_0$. It is also possible to use such information extraction to reproduce a straight line having interruptions or distortions.

In the prior art Hough transformation method, however, it is necessary to obtain mapping functions corresponding to every point. The number of points for which the mapping functions are to be obtained is quite large. Hence, it takes a considerable length of time if such mapping functions are obtained by calculations in a point-by-point manner. Accordingly, it is difficult to extract information at a high speed.

Prior art technology for three-dimensional measurement of an object article includes a method for detecting the three-dimensional direction of a line or a plane existing in space, a method of using the vanishing point, and a method of binocular vision. However, these prior art methods may be used only under limited conditions of measurement.

SUMMARY OF THE INVENTION

It is an object of the present invention to provide an improved device able to extract information of a picture at a relatively high speed using the mapping process.

It is another object of the present invention to provide an improved information extraction device which may be used for the detection of the three-dimensional direction of a single line or a single plane existing in space.

It is another object of the present invention to provide an improved information extraction device which may be used for the detection of the existence of a line segment, the intersection point of lines, and the three-dimensional direction of parallel lines.

In accordance with the fundamental aspect of the present invention there is provided an information extraction device for extracting information of a picture on a plane in question by mapping including: a coordinate transformation unit for transforming the coordinate values of points on the plane in question to the coordinate values of the points on a spherical surface corresponding to the points on the plane in question; a mapping unit for mapping the points on the spherical surface to great circles, each of the greats circles being defined by the intersection between the spherical surface and a plane which is perpendicular to the radius connecting the center of the sphere and the point in question on the spherical surface and including the center of the sphere; and an information extraction unit for extracting information of the picture on the plane in question on the basis of mapping function data of coordinate values of the points obtained by the mapping unit.

In accordance with another aspect of the present invention, there is provided an information extraction method for extracting information of a picture on a plane in question by mapping including the steps of: transforming the coordinate values of points on the plane in question to the coordinate values of the points on a spherical surface corresponding to the points on the plane in question; mapping the points on the spherical surface to great circles, each of the great circles being defined by the intersection between the spherical surface and a plane which is perpendicular to the radius connecting the center of the sphere and the point in question on the spherical surface and including the center of the sphere; and extracting information of the picture on the plane in question on the basis of the mapping function data of coordinate values of the points obtained in the mapping step.

In accordance with a further aspect of the present invention, there is provided an information extraction method for extracting information of a picture on a plane in question by mapping including the steps of: setting reference points on the plane in question; obtaining and storing the data of the mapping functions of the set reference points; obtaining data of relative positions of points on the plane in question with respect to the reference points; shifting the mapping functions of the reference points in coordinate values on the mapping plane by the obtained relative position data of points on the plane in question; obtaining mapping functions of points on the plane in question from the result of the shifting of the mapping functions of the reference points; and extracting information of a picture on the plane in question on the basis of mapping function data of coordinate values of the points.

BRIEF DESCRIPTION OF THE DRAWINGS

In the drawings, FIGS. 1 to 8 the principle of spherical mapping using a spherical projection in the information extraction device according to the present invention;

FIGS. 19, 19a, 19b show an example of the mapping processor used for the information extraction device according to the present invention;

FIGS. 30 to 37 illustrate an embodiment wherein a bandwidth is given to a mapping function;

FIGS. 38 to 40 illustrate an embodiment wherein a bandwidth and suppression regions are given to a mapping function;

FIGS. 41 to 43 illustrate a process of production of a mapping function wherein a bandwidth is applied;

DESCRIPTION OF THE PREFERRED EMBODIMENTS

Introduction

The information extraction according to the present invention is based on mapping. There are two methods employed in the mapping: spherical projection and Hough transformation.

In the spherical projection method, a great circle on the sphere is used as the mapping function, while in the Hough transformation method a Hough transformed sine wave is used as the mapping function. In each of the methods, points on the plane in question are transformed into mapping functions, the obtained mapping functions are written in the mapping plane, and the information contained in each of the points in the plane in question, such as the existence of a straight line and the position and direction of the straight line, is extracted from the mutual relationship of the mapping functions, such as the intersection point of the straight lines.

In the process of production of the mapping function, it is necessary to produce a mapping function for each of the points. The production of the mapping functions accounts for the largest part of the time required for information extraction using mapping.

Spherical Mapping Using Spherical Projection

The principle of spherical mapping using a spherical projection is described with reference to FIGS. 1 to 4. The fundamental process of spherical mapping using a spherical projection is as follows. An original picture is projected on the surface of a sphere to create a spherical projection. Great circles are drawn on the surface of the sphere corresponding to each of the projected points. Each great circle is defined by the intersection between the surface of the sphere and the plane which is perpendicular to the radius connecting the center of the sphere and the point in question on the surface of the sphere, that plane including the center of the sphere.

The required information is extracted from the mutual relationship between the drawn groups of the great circles.

By such a fundamental process of the spherical mapping, the normal vector of the plane containing the points of the original picture and the center of the sphere is obtained. At the same time, a line segment can be extracted and an interrupted or distorted line segment can be reproduced. When mapping the information of the changing projection to a single point on the surface of the sphere, the path of a point-type object article carrying out linear movement is extracted. When mapping the projection of a plurality of line segments to a single point on the surface of the sphere and in subsequent mapping of the obtained mapping point, the intersection point of the plurality of line segments is reproduced.

Figure 1:
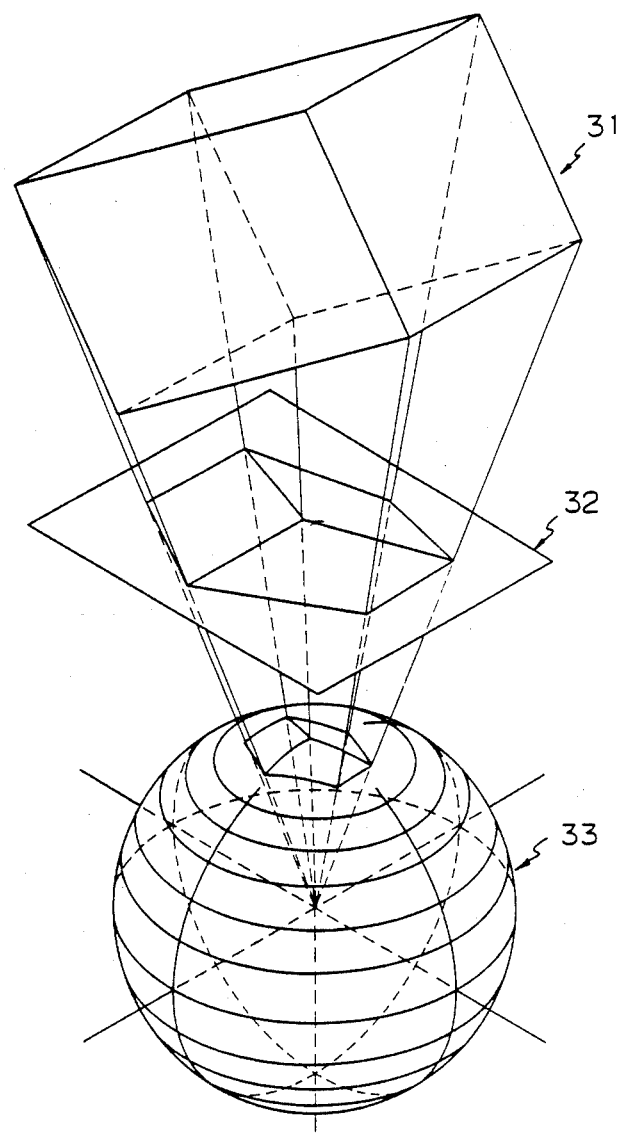

In FIG. 1, a cubic configuration 31 is projected onto a flat plane 32 as a plane projection and to the surface of a sphere 33 as a spherical projection. It is assumed that a camera is positioned at the center of the sphere 33. The photograph taken by the camera using an ordinary lens takes the form of the plane projection on the plane 32, while the photograph taken by the camera using a fish-eye lens takes the form of the sphere projection on the surface of the sphere 33.

In the following description of the spherical projection, the radius of the sphere is assumed as a unit length.

Figure 2:
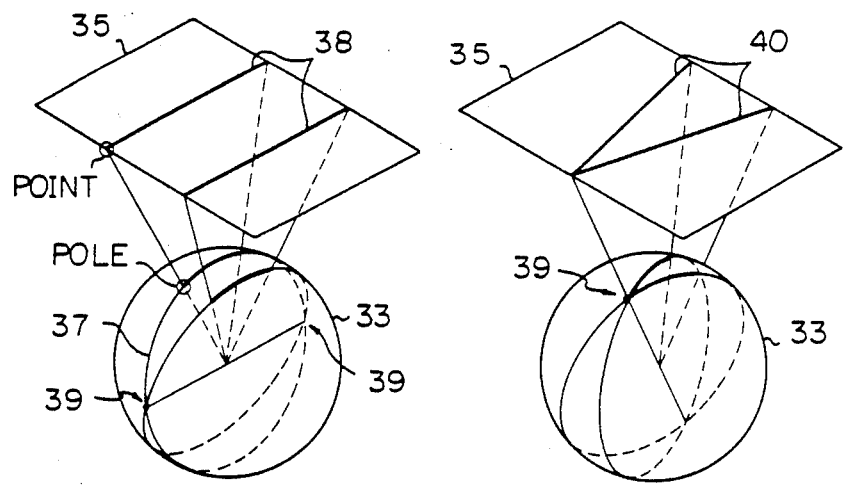

As shown in FIG. 2, straight line segments 38 on an Euclidian plane 35 are projected on the surface of a sphere 33 as portions of great circles 37. The great circles 37 may be defined as straight lines on the surface of the sphere 33. The "point" on the plane 35 corresponds to the pole on the surface of the sphere 33, which pole may be defined as a point on the surface of the sphere 33. By using the spherical projection, the spherical geometry, particularly Liemann's elliptic non-Euclidian geometry, is established, instead of Euclidian geometry.

With such a spherical projection, the projections of the parallel lines 38 in a Euclidian plane 35 intersect the spherical surface 33 at the points 39 defining a finite range of length. Of course, the projections of the intersecting lines 40 in the Euclidian plane 35 also intersect the spherical surface 33. Thus, with the spherical projection, the intersection point of the parallel lines at infinite distance is measured by the latitude and longitude of the sphere. This measurement by spherical projection is the basis of the three-dimensional measurement by spherical mapping.

Figure 3:
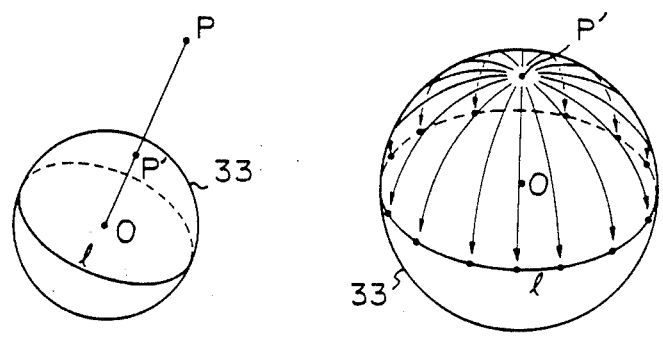

The correspondence of a point to a line, i.e., a great circle on the surface of the sphere; is illustrated in FIG. 3. A point P in space is projected to a point P' on the surface of the sphere 33 by spherical projection. The mapping of the point P' to the great circle, i.e., line l is carried out by spherical mapping. As shown in FIG. 3, the mapping of the point P' to the line l is given as the line on the surface of the sphere 33 as cut by the plane perpendicular to the radius connecting the point P' and the center O of the sphere and including the center O. By this spherical mapping, the correspondence of the point P in space to the line l on the surface of the sphere 33 is achieved.

Figure 4:
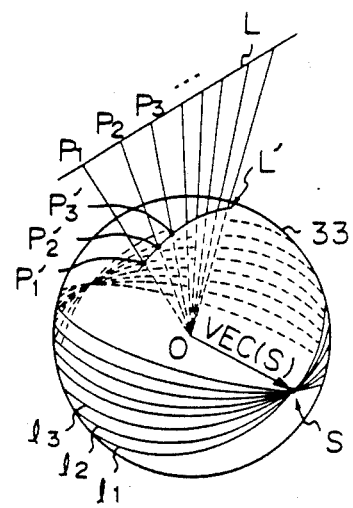

The correspondence of a line to a point defined by a group of lines by the spherical mapping is illustrated in FIG. 4. A line L in space is projected to a line L' on the surface of the sphere 33 by the spherical mapping. Points $P_1, P_2, P_3 \ldots$ on the line L are projected to points $P'_1, P'_2, P'_3 \ldots$ on the line L'. Mapping of the points $P'_1, P'_2, P'_3 \ldots$ to a group of lines $l_1, l_2, l_3 \ldots$, which is a group of great circles, is carried out. The group of these great circles intersect at two points on the surface of the sphere 33, which points are symmetrical with respect to the center of the sphere 33. These two points are represented by one of these two points. This representative point is called "point S" and is used as a mapping point. The information of the line L can be said to be condensed at the spoint S by spherical mapping. The points $P_1, P_2, P_3 \ldots$, the points $P'_1, P'_2, P'_3, \ldots$, and the lines $l_1, l_2, l_3, \ldots$ may be regarded as continuous points and lines. However, in practice, the points $P_1, P_2, P_3 \ldots$, the points $P'_1, P'_2, P'_3 \ldots$, and the lines $l_1, l_2, l_3 \ldots$ may be discrete points and lines due to the structure of the light receiving sensor elements or the picture memory.

The vector from the center of the sphere to point S may be expressed as VEC(S). VEC(S) is the normal vector of the plane containing the line L and the original 0.

Reproduction of an interrupted or distorted line is described with reference to FIG. 5. Sometimes, in a picture taken by a camera, there are distortions due to noise signals and partially unclear portions due to the background. To counter such phenomena, a line segment is reproduced from a line segment having interruptions or distortions by information condensation using the spherical mapping.

Such a process is described with reference to FIG. 5. When mappings of line segments $LS_1$ in space are carried out, if these line segments $LS_1$ are portions of the same straight line, notwithstanding the existence of interruptions or distortions, the spherical mapping points of these line segments are assembled in the close vicinity of a certain point S, as shown in the left illustration of FIG. 5. That is, the great circles, which are the mapping functions of the points on the line segment, pass through the close vicinity of the point S.

Hence, reproduction of line segments can be carried out by designating the peak point where the great circles are assembled most frequently as the point S and mapping from the obtained point S to line $L_2$.

Figure 6:
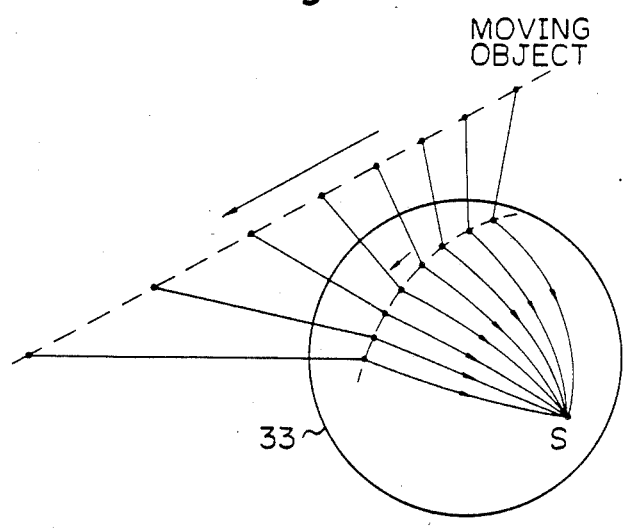

The detection of the motion of a moving object, in this case a point, is described with reference to FIG. 6. For example, the projection images are stored in sequence at predetermined intervals in a picture memory.

After that, the difference between the present projection image and the just preceding projection image is obtained. The change of the projection image can be extracted in this way.

Once the change in the projection image on the surface of the sphere 33 is extracted, the mapping functions of the changed projection points are successively accumulated.

If the object is carrying out linear motion, the value of the accumulation of the signals resulting from the mapping at a certain point is increased. The peak position of such accumulation is designated as point S. Then, inverse mapping is carried out, as in the case shown in the right illustration in FIG. 5.

By such inverse mapping, the path of the projection point of the moving point object on the surface of the sphere 33 can be extracted.

Also, it is possible to detect the motions of plural objects (points) simultaneously according to the above-described method. The longer the travel distance of the objects (points), the larger the value of the peak, thus the better the signal-to-noise (S/N) ratio.

Figure 7:
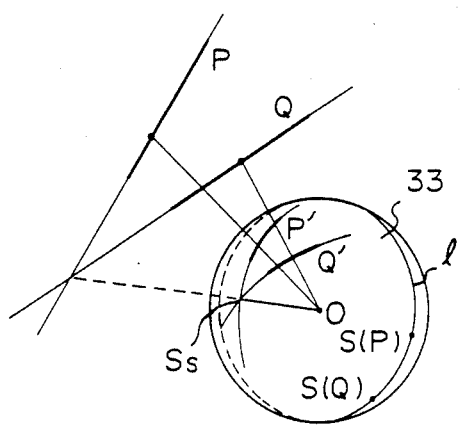

The intersection point of lines can be reproduced in a similar manner, as shown in FIG. 7. The point S of the line segment P is S(P), while the point S of the line segment Q is S(Q). The great circle passing through S(P) and S(Q) is l. The radius normal to the plane containing the great circle l passes through the intersection point of the line P' and the line Q'. The lines P' and Q' are projections on the surface of the sphere 33 of the lines P and Q. The intersection point of the line P' and the line Q' is called point $S_S$, from the nature of a second mapping after a first mapping. That is, by the subsequent mapping of the S points of the line segments, the intersection point $S_S$ is reproduced. The information of the points on each line segment is accumulated at the points S. The information of the S points on the great circle l are accumulated at the point $S_S$. It may be considered that the information of all the points constituting the original line segments is accumulated at the point $S_S$. Hence, reproduction of the intersection point can be attained with a high S/N ratio. The above-described technique is also applicable to the case where three lines intersect at one point.

The case of plural parallel lines is described with reference to FIG. 8. It may be said that such parallel lines intersect at an infinite point. It is difficult to obtain the infinite point by ordinary methods.

However, it is possible to obtain the intersection point $S_S$ on the surface of the sphere 33, similarly as in the case of two intersecting lines. Moreover, as the number of parallel lines increases, the reproduction of the intersection point can be carried out with a higher S/N ratio.

The decision whether the point $S_S$ actually indicates parallel lines is carried out as follows. The camera which takes the picture of the parallel lines carries out translational motion. If, in spite of such translational motion of the camera, no movement of the point $S_S$ occurs, the lines corresponding to the point $S_S$ are judged parallel. If, by such translational motion of the camera, movement of the point $S_S$ occurs, the lines corresponding to the point $S_S$ are judged non-parallel.

The decision can be carried out in a similar manner by using two cameras instead of the motion of one camera. If the $S_S$ points obtained from the pictures by these two cameras are the same point, the lines are parallel.

Fundamental Process of Spherical Mapping

Figure 9:
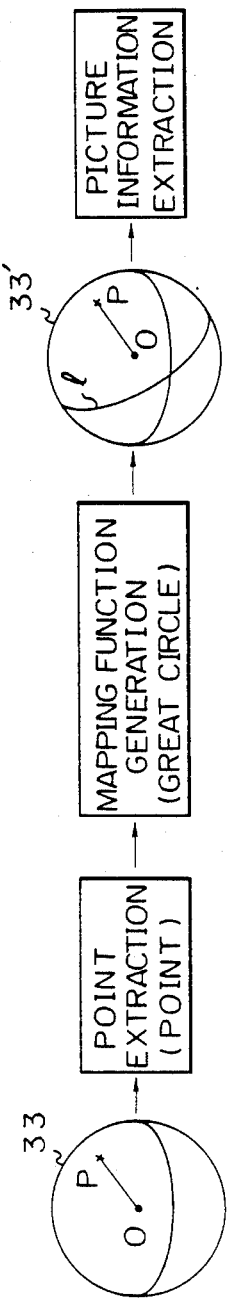
FIG. 9 shows the fundamental process of the information extraction device using spherical mapping according to the present invention.
Figure 10A:
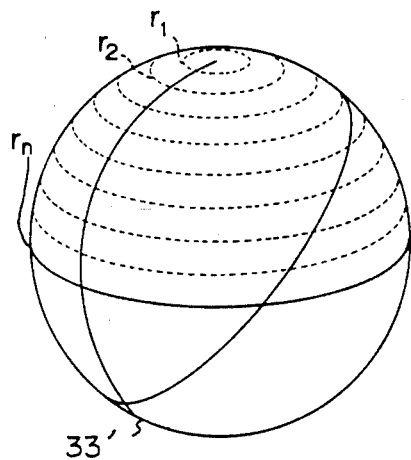
FIGS. 10, 11, 12, 13a 13b illustrate the production of the mapping function used for the information extraction device according to the present invention.
Figure 10B:
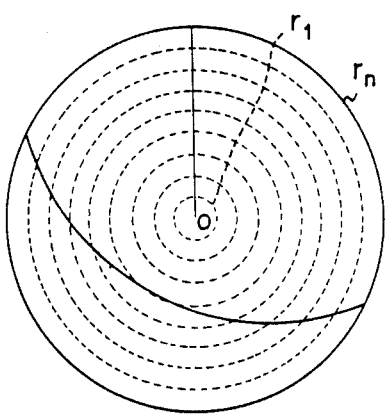

The fundamental process of spherical mapping used in an embodiment of the present invention is described with reference to FIG. 9. A point P on the surface of the sphere 33 (actually a memory corresponding to the sphere 33) is extracted. The mapping function, which is a great circle, of the point P is produced and written into the surface of another sphere 33' (actually a memory corresponding to the sphere 33'). The intersection point S of great circles $l_1$ and $l_2$ is obtained. From the position of the intersection point S, the information of the points on the surface of the sphere 33 are extracted.

Figure 5:
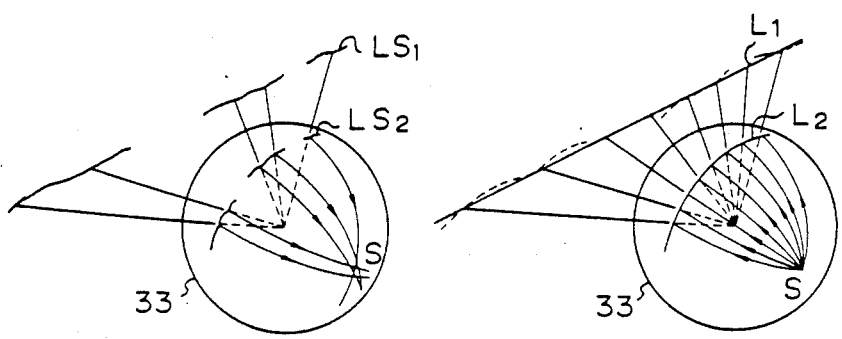
Figure 8:
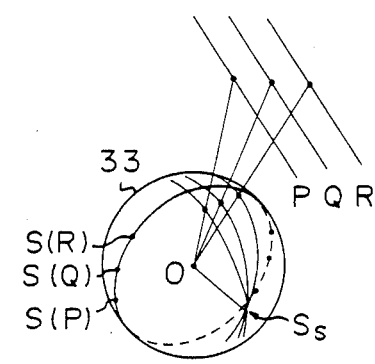

Thus, the extraction and the reproduction of a line segment are carried out as illustrated in FIGS. 4 and 5, and the extraction of the intersection point of the line segments and a plane is carried out as illustrated in FIGS. 7 and 8.

Production of Mapping Function

It is necessary to produce the mapping functions $l_i$ from the points $P_i$ on the surface of the sphere, in order to carry out information extraction by spherical mapping. The mapping functions $l_i(l_1, l_2, l_3 ...)$ correspond to the points $P_i(P_1, P_2, P_3 ...)$. It would take considerable time if the calculation were carried out for each set of coordinates of the great circles corresponding to the great circles. In order to achieve mapping at a high speed, the mapping plane is specially structured so as to increase the speed of smaller and allow use of a smaller capacity memory. The production of the mapping function is carried out as illustrated in FIGS. 10 to 15. In the illustration of the spherical surface in FIG. 10, the mapping plane, i.e., the surface 33' of the sphere, is divided by concentric latitude lines $r_1, r_2 ... r_n$. Corresponding to this division, in the illustration of the mapping plane of the memory in FIG. 10, the memory of the mapping plane is also divided by the concentric circles $r_1, r_2 ... r_n$. This means that the mapping plane is expressed by the polar coordinate system of r and $\theta$.

Figure 11:
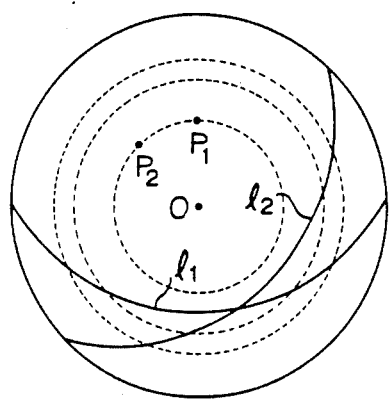

As shown in FIG. 11, in such a polar coordinate system, the great circle $l_2$ of point $P_2$, which is positioned on the same concentric circle as point $P_1$, is the great circle rotated around the center O of the concentric circles from the great circle $l_1$. The angle of such rotation of the great circle is the same as the angle between point $P_1$ and point $P_2$. Thus, the great circles corresponding to the points on the same concentric circle are obtained by the rotation of a single great circle.

Figure 12:
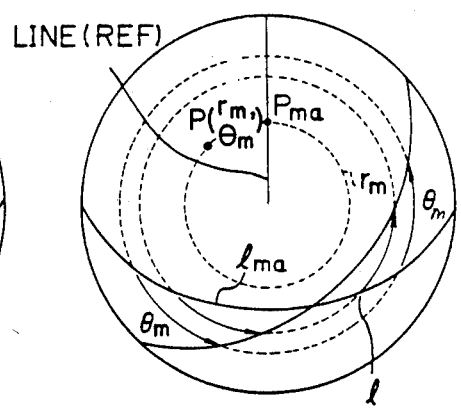

As shown in FIG. 12, a radius LINE(REF) is selected as the reference line carrying the reference points $P_{ma}$, which are the intersection points with the concentric circles $r_m$. A single great circle $l_{ma}$ is registered as the reference great circle corresponding to the reference point $P_{ma}$. Hence the great circle l corresponding to the point $P(r_m, \theta_m)$ which is positioned at angle $\theta_m$ on the concentric circle from point $P_{ma}$ is obtained by the rotation $\theta$ of the reference great circle $l_{ma}$.

Figure 13A:
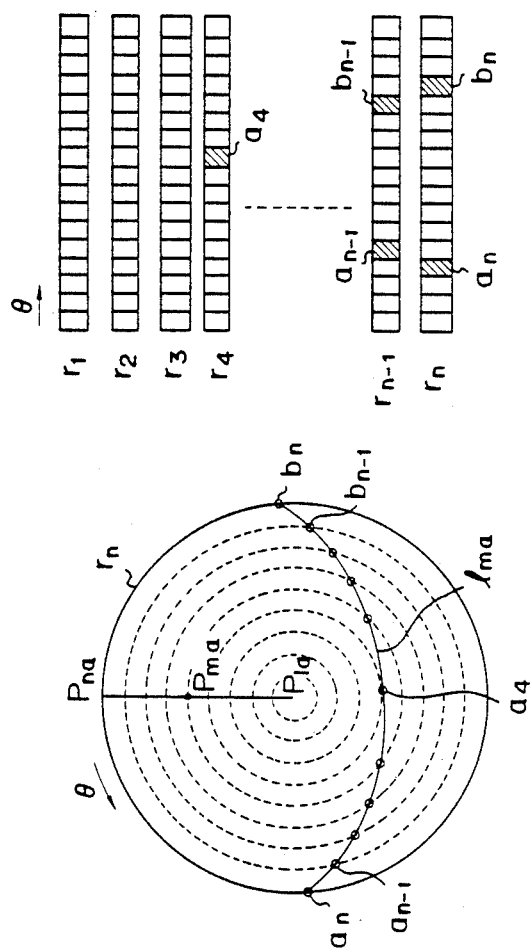
Figure 13B:
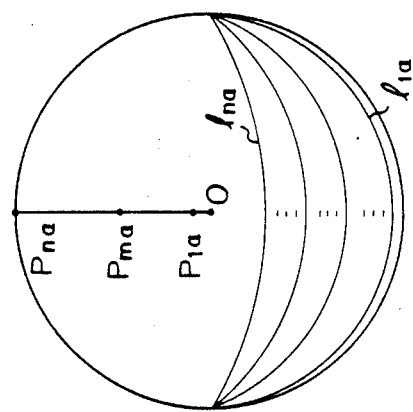

As shown in the illustration of the reference line and reference great circle in FIG. 13, the pattern of the reference great circle $l_{ma}$ is registered by registering the intersection points of the great circle $l_{ma}$ with the concentric circles $r_1, r_2 ... r_n$.

As shown in the illustration of the pattern of reference great circle in FIG. 13, the pattern of the reference great circle is registered in the matrix with quantized units having r rows $(r_1, r_2, ... r_n)$ and $\theta$ columns. The $\theta$ columns are defined by equal divisions of 360°. The sections with a hatching $a_4, a_{n-1}, b_{n-1}, a_n, b_n$ in the matrix with quantized units correspond to the intersection points of the reference great circle with the concentric circles. In the actual memory, a bit "1" is written at the section having a hatching in the matrix with quantized units. The pattern of the great circle 1 shown in FIG. 12 is obtained by shifting the pattern in the matrix with quantized units shown in FIG. 13 in the $\theta$ direction.

As shown in the illustration of the registration of sequence of great circles in FIG. 13, the great circles have different shapes depending on the radius of the reference point $P_{ma}$, that is, the radius $r_1, r_2 ... r_n$ of the concentric circles. The great circles $l_{1a}, l_{2a} ... l_{na}$ are registered corresponding to the reference points $P_{1a}, P_{2a} ... P_{na}$ of the concentric circles $r_1, r_2 ... r_n$.

Assuming the number of the picture elements along the side of a picture is "n", which is approximately equal to the number of the concentric circles, and the number of bits required for registering a great circle is "q", the capacity of a read-only memory (ROM) required for registering the great circles is "q×n" bits.

If all the patterns of the great circles for every point were registered, the ROM required for registering all the entire patterns would have to be a large number according to q multiplied by the number of all the points.

Hence, the capacity of the memory used in the system illustrated in FIG. 13 is reduced by 1/2n from the case of the above-mentioned complete registration.

As shown in the illustration of the registration by values of $\theta$ in FIG. 13, it is possible to register the pattern of the great circle by the values of $\theta$, instead of registration by the bit pattern. Assuming the periphery of a concentric circle is divided into 17 picture elements (bits), the coordinate of the intersection point is registered. In FIG. 13, coordinate 10 for $r_4$, 5 and 13 for $r_{n-1}$, and 4 and 14 for $r_n$, are illustrated. In this connection, an impossible coordinate value, for example, "20", which is greater than the maximum coordinate value "17" in the present embodiment, may be written to indicate the absence of the intersection point, in order to prevent inadvertent transformation of the coordinates to a new existing coordinate value.

Production and Storage of Data Mapping Function

An example of the system for producing and storing mapping functions is explained with reference to FIG. 14. The system shown in FIG. 14 includes a ROM 40 for great circles, an adder 41, and a memory 42 for mapping functions the ROM 40 stores. The mapping functions in the form of patterns S of great circles corresponding to the reference points $P_{1a}, P_{2a} ... P_{na}$ of the concentric circles, by the values of $\theta$ as shown in FIG. 13. The adder 41 adds the rotation position $\theta_m$ of the point in question to the value $\theta$ of the great circle corresponding to the reference point as the output of the ROM 40. From the memory 42, the signal of the writing address is supplied and the patterns of great circles are written.

Figure 14:
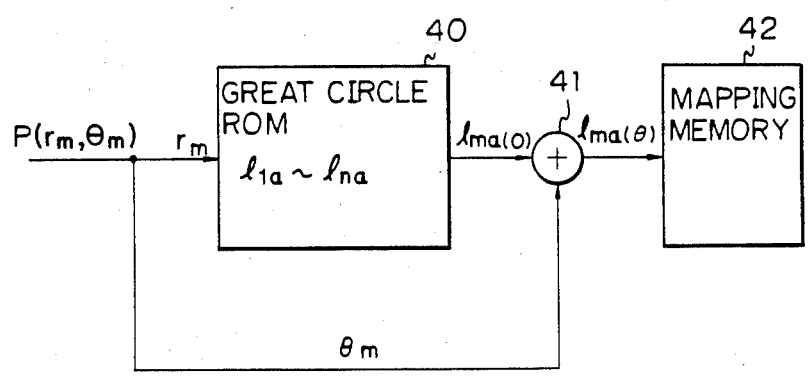
FIGS. 14 to 18 illustrate the generation and the storage of the data of the mapping function.

The operation of the system shown in FIG. 14 is as follows. The coordinates of the point P are given in the form of the polar coordinate system, that is, in the form of the position $r_m$ of the concentric circle and the rotational position $\theta_m$ from the reference position $P_{ma}$ on the concentric circle $r_m$. The signal of $r_m$ is supplied to the ROM 40. The ROM 40 carries out the retrieval of the pattern $l_{ma}$ of the great circle corresponding to the reference point $P_{ma}$ on the concentric circle $r_m$ and delivers the signal of the pattern $l_{ma}$ of the great circle and the signal of intersection points of the great circle pattern $l_{ma}$ and the concentric circles. The adder 41, to which the rotational position $\theta_m$ of the point P is input, carries out the addition of the rotational position $\theta_m$ to the position $\theta$ of the intersection points on the concentric circles and delivers the result of the addition. For example, $\theta_m$ is added to the values of the great circle pattern shown in FIG. 13.

In the above-described manner, the shifting of the great circle pattern and the writing of the great circle corresponding to the point P to the memory 42 for the mapping functions in the form of the division of the concentric circles are carried out. Thus, mapping is carried out by producing great circles corresponding to the point by the ROM 40 on the basis of the reference great circle and writing the produced great circles into the memory 42.

Figure 15:
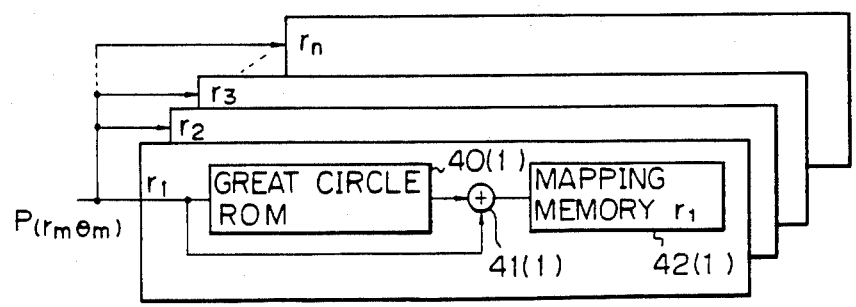

Another example of the system for producing and storing mapping functions is explained with reference to FIG. 15. The memory 42 for the mapping comprises memories 42(1), 42(2) ... 42(n), for the mapping of the concentric circles, divided corresponding to the concentric circles $r_1, r_2 ... r_n$. The memory 40 for great circles consists of the memories 40(1), 40(2) ... 40(n), for the great circles of the concentric circles, divided per the intersection points of the great circles $l_{1a}, l_{2a} ... l_{na}$ with the concentric circles corresponding to reference points $P_{1a}, P_{2a} ... P_{na}$. For example, the intersection points of the great circles $l_{1a}, l_{2a} ... l_{na}$ with the concentric circle $r_1$ are stored in the ROM 40(1). Similarly storage into the ROM's 40(2), 40(3) ... 40(n) is carried out. n units of adders 40 are provided. The system shown in FIG. 15 can be regarded as that of the system shown in FIG. 14, divided per the concentric circle and set in parallel. The speed of operation of the system shown in FIG. 15 is n times that of the system shown in FIG. 14.

Another example of the system for producing and storing mapping functions is explained with reference to FIGS. 16 and 17, in which a division other than the above-described system using the concentric circles and the rotational position is used. As illustrated in part-1 of FIG. 17, the length of arc L along the concentric circle from the reference line is used instead of the rotational position $\theta$, and the coordinates (r, L) are used instead of the coordinates (r, $\theta$).

Figure 17A:
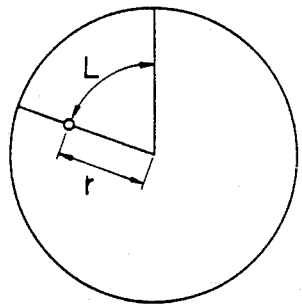
Figure 17B:
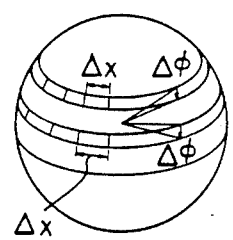
Figure 17C:
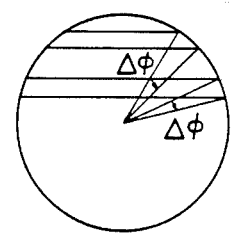

As shown in part-2 of FIG. 17, the length $\Delta x$ of the picture element is the same in every concentric circle. When the width $\Delta \phi$ of the concentric circles is selected to be a constant value, the area of the picture element of each of the concentric circles becomes uniform so that a constant resolution is obtained.

Figure 16:
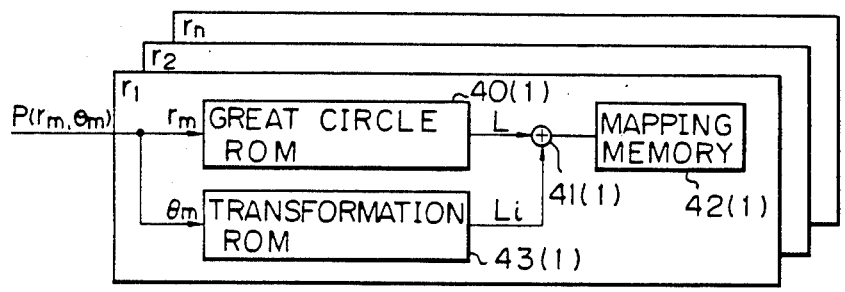
Figure 18:
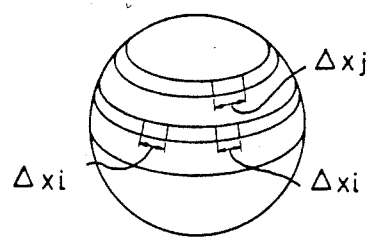

A system for producing the mapping function according to the manner shown in FIG. 17 is shown in FIG. 16. The system shown in FIG. 17 utilises parallel calculation. In the system shown in FIG. 16, the above-mentioned coordinates of the intersection points are registered by a distance value L, instead of a rotational position value, into the great circle ROM's 40(1), 40(2), ... 40(n). The coordinates of the point P are given in the form of ($r_m$, $\theta_m$). The rotational position $\theta_m$ is transformed into the distance $L_i$. The adders 41(1), 41(2) ... 41(n) carry out the addition of L and $L_i$, instead of the addition of rotational positions, and provides the writing address for the mapping function memories 42(1), 42(2) ... 42(n). The mapping function memories 42(1), 42(2) ... 42(n) are divided for each of the concentric circles in correspondence with the length L. It is also possible to use series calculation, instead of the above-described parallel calculation. When the constant $\Delta \phi$ as shown in FIG. 17 cannot be realized, it is possible to make the area of each of the picture elements constant by changing the length of the picture element. A system for such a division of the memory is illustrated in FIG. 18. In the illustration of FIG. 18, the area of the picture element is made uniform by changing the value of the length of the picture element from $\Delta x_i$ to $\Delta x_j$ in correspondence with concentric circles.

Example of Mapping Function Processor

Figure 19B:
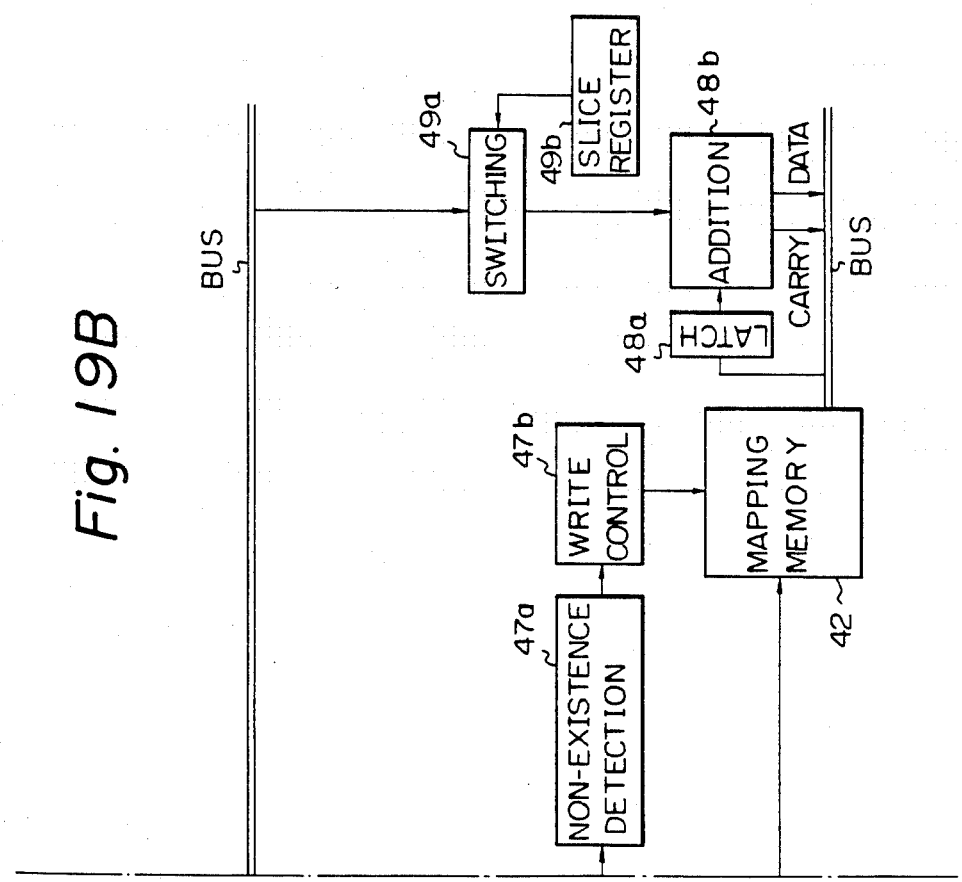

An example of the mapping function processor used for the information extraction device according to the present invention is shown in FIG. 19. The system shown in FIG. 19 includes a concentric circle counter 44, a ROM 45 for maximum value for the concentric circles, a great circle ROM 40, a shift ROM 43, an adder 41, a normalization circuit 46, a circuit 47 a for detecting the non-existence of a great circle, a write control circuit 47b, a latch circuit 48a, an adder 48b, a switching circuit 49a, and a slice register 49b.

The concentric circle counter 44 produces a sequence of the addresses of the concentric circles $r_1, r_2 ... r_n$ and supplies the produced addresses to the great circle ROM 40, to the shift ROM 43, and the like. The ROM 45 stores the maximum value of the length in the direction of rotation along the concentric circle corresponding to the address of the counter 44, for the coordinate system of (r, L) shown in FIGS. 16 and 17. The circuit 46 carries out normalization when the output of the adder 41, which is the sum of the outputs of the ROM 40 and the ROM 43, exceeds 360° from the reference point, in terms of rotational angle, since 360° is the maximum rotational angle of the concentric circle.

The circuit 47a monitors the output of the great circle ROM 40 and delivers a writing prohibition signal when the output of the ROM 40 is an impossible value, for example 512, which exceeds the maximum value of for instance 460. The circuit 47b prohibits the writing of the writing address from the normalization circuit 46 into the mapping memory 42 by the writing prohibition signal of the circuit 47a. The latch circuit 48a latches the data read from the mapping memory 42. The adder 48b carries out addition of the values supplied from the switching circuit 49a when the content of the latch circuit 48a is other than 0 and supplies the result of the addition through the bus BUS to the mapping memory 42.

The switching circuit 49a carries out switching for supplying the adder 48b selectively with the weight W of the point from the bus BUS or the slice value from the slice register 49b as the value to be added. The slice register 49b registers the slice value for detecting the peak point of the mapping memory 42.

The operation of the mapping function processor shown in FIG. 19 will now be described. The coordinates ($r_m$, $\theta_m$) of the point and the weight W of this point are given. The coordinate $r_m$ in the direction of the concentric circle is supplied to the ROM 40 and the reference great circle $l_m$ corresponding to $r_m$ is selected accordingly. The coordinate $\theta_m$ in the direction of rotation is supplied to the ROM 43 and the group of the distances $L_m$ corresponding to $\theta_m$ is selected accordingly. The counter 44 delivers in sequence the addresses of the concentric circles and the delivered addresses are supplied to the concentric circle maximum value ROM 45, the great circle ROM 40, and the shift ROM 43. The maximum value of the concentric circle is delivered from the ROM 45. The coordinates of the intersection points of the reference great circle with the concentric circle are delivered from the ROM 40. The shift distance in the concentric circle, among the group of distances $L_m$, is delivered from the shift ROM 43.

The adder 41 adds the coordinates of the intersection point from the ROM 40 to the shift distance from the ROM 43, and the result of the addition is supplied to the normalization circuit 46. The normalization circuit 46 carries out a comparison between the maximum value from the ROM 45 and the value from the adder 41. When the value from the adder 41 is smaller than the maximum value, the normalization circuit 46 supplies the mapping memory 42 with the value from the adder 41 as the writing address. When the value from the adder 41 is greater than the maximum value, the normalization circuit 46 supplies the mapping memory 42 with the value from adder 41 minus the maximum value as the writing address.

The coordinates of the intersection point are supplied from the ROM 40 to the circuit 47a. When the circuit 47a detects the above-mentioned impossible value as the coordinates of the intersection point, the decision is carried out that the output of the ROM 40 indicates a reference great circle having no intersection point with the concentric circles, and the writing prohibition signal is supplied to the write control circuit 47b so that the writing into the writing address in question of the mapping memory 42 is prohibited. When no writing prohibition signal is delivered, writing into the address in question of the mapping memory 42 is carried out.

The content of the writing position is read from the mapping memory 42, and the read content is supplied via the bus BUS to the latch circuit 48a. The switching circuit 49a selects a weight W from the bus BUS and supplies the selected weight W to the adder 48b. The adder 48b adds the weight W to the content of the latch circuit 48a, and the result of the addition is supplied to the bus BUS so that the writing into the writing position in question of the mapping memory 42 is carried out. Of course, the weight W is equal to 1 when no weight is assigned to the points.

Thus, the great circles resulting from the shifting of the reference great circle are written into the mapping memory 42 according to the sequence of the concentric circles and according to the addresses of the concentric circles which are the outputs of the concentric circle counter 44, so that the storage of the great circles carrying weight values is carried out. After the writing of a great circle corresponding to a point P into the mapping memory 42 is completed, the coordinates and the weight value of the next point are supplied through the bus BUS, and the writing of a great circle corresponding to this next point into the mapping memory 42 is carried out.

After the writing of the great circles corresponding to all the points into the mapping memory 42 is completed, a search of the peak point from the content of the mapping memory 42 is carried out. The peak point is the intersection point of the above-described plurality of great circles. The search is carried out as follows.

The switching circuit 49a is switched to the slice register 49b, and the slice value of the slice register 49b is supplied to the adder 48b. The contents of the mapping memory 42 are read in sequence from the mapping memory 42 and are supplied through the bus BUS to the latch circuit 48a.

The addition of the value which is latched in the latch circuit 48a to the slice value is carried out in the adder 48b. The adder 48b delivers a carry signal only when overflow occurs as the result of addition. No output is delivered except with such overflow. The slice value is selected such that no carry signal is delivered except for the peak point. Hence, the carry signal is delivered corresponding only to the peak point. Thus, the slicing operation in the addition process is carried out.

The output of the adder 48b is supplied through the bus BUS to the mapping memory 42, and the writing into the position in question of the mapping memory 42 is carried out. Thus, the replacing writings of data "1" to the addresses corresponding to the peak point and of data "0" to the remaining addresses, are carried out.

Thus, the data "1" is stored in the address of the mapping memory 42 corresponding to the point S shown in FIG. 4, and data "0" is stored in the remaining addresses of the mapping memory 42. By obtaining the point S, information extraction by the mapping is achieved.

Example of System to Which a Mapping Applied

A three-dimensional measuring system for an object will be described as an application of the data extraction method by mapping.

Figures 20, 20A:
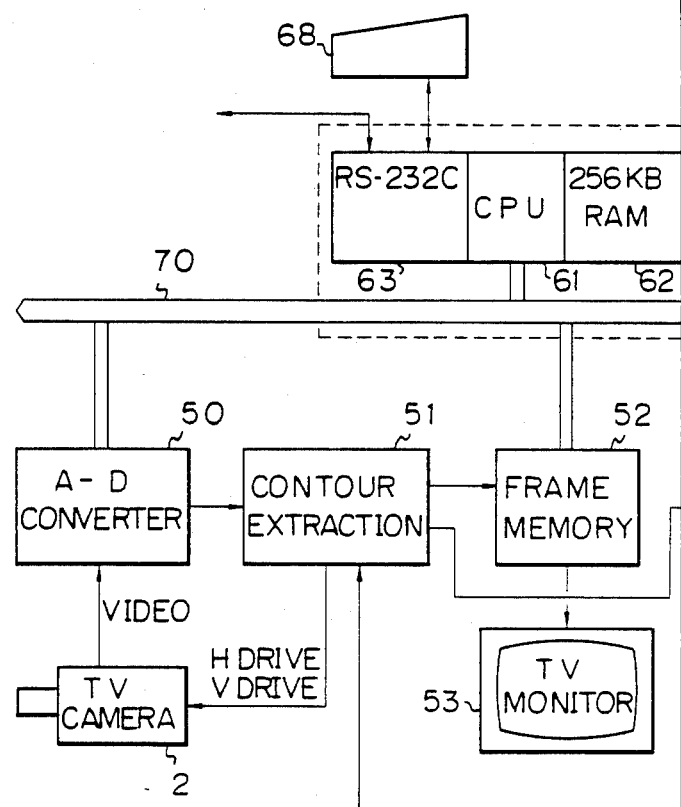
FIGS. 20, 20a, 20b show a three-dimensional measurement system as an example of the system to which the mapping processor is applied.
Figure 20B:
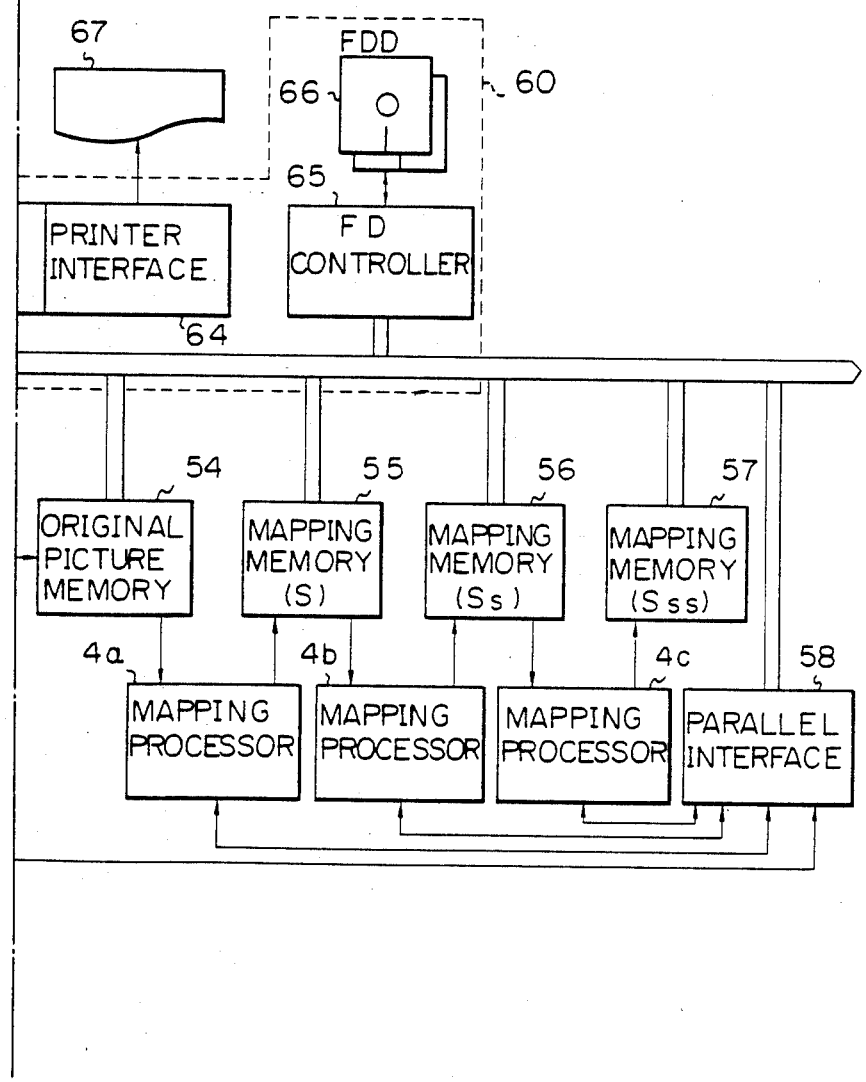

FIG. 20 is a block diagram of an example of a three-dimensional measuring system. Reference numeral 2 denotes a television camera such as a spherical camera, which will be described later; and 4a, 4b, and 4c, mapping processors, respectively. Each mapping processor has the system configuration shown in FIG. 19. Reference numeral 50 denotes an analog-to-digital (A/D) converter for converting a video signal generated by the television camera 2 to a multi-value digital picture signal, and 51 denotes a known contour extraction section 51 for extracting a contour component from the picture signal supplied from the A/D converter 50. A contour-extracted picture signal is stored in a frame memory 52, which will be described later, and coordinate and weighting data of the contour points are stored in an original picture memory 54. The frame memory 52 stores the contour-extracted picture signal, as described above. Reference numeral 53 denotes a television monitor for monitoring the contents of the frame memory 52. The original picture memory 54 stores the coordinate and weighting data of the points of the contour component extracted by the contour extraction section 51, as described above. Reference numerals 55, 56, and 57 denote mapping memories for storing the results of mapping by the mapping processors 4a, 4b, and 4c, respectively; and 58 denotes a parallel interface for sending commands from the mapping processors 4a, 4b, and 4c to the contour extraction section 51 and for causing these processors and the extraction section to exchange data through a recognition section 60 and a bus, which will be described below.

The recognition section 60 controls the overall operation of the system and recognizes a three-dimensional original picture of the television camera 2 by utilizing the mapping results. The recognition section 60 comprises components designated by reference numerals 61 to 66. A processor 61 performs overall system control and recognition in accordance with the execution of a program. A main memory 62 comprises a RAM for storing data or the like required for processor operation. An interface 63 is connected to an external device or a keyboard 68, which will be described later, through which commands and data are entered. A printer interface 64 is connected to a printer 67, which will be described later, and supplies commands and data thereto. A floppy disk controller 65 controls a floppy disk drive 66 as an external memory device. The printer 67 prints out data or the like as needed. Commands and data are entered through the keyboard 68. The processor 61 in the recognition section 60 is connected to the A/D converter 52, the frame memory 52, the original picture memory 54, the mapping memories 55, 56, and 57, the parallel interface 58, and the floppy disk controller 65 through a multibus 70 and can send commands to and exchange data with these components therethrough.

Description of Television Camera

An image of an object shown in FIG. 1 is obtained by the spherical projection by using a television camera 2 in FIG. 20. This operation will be described with reference to FIGS. 21 to 23.

Figure 21A:
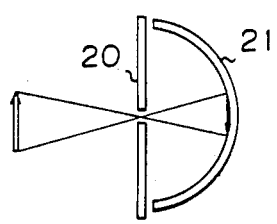
FIGS. 21 to 23 illustrate a television camera used for the information extraction device according to the present invention.
Figure 21B:
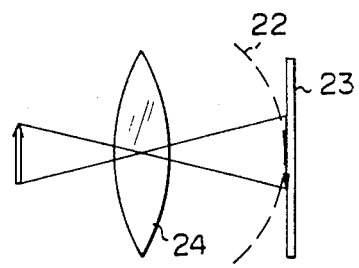
Figure 21C:
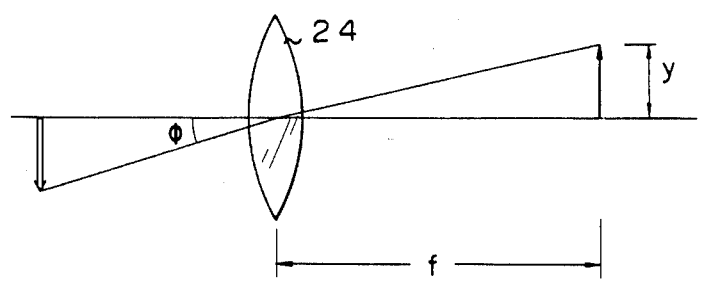
Figure 22:
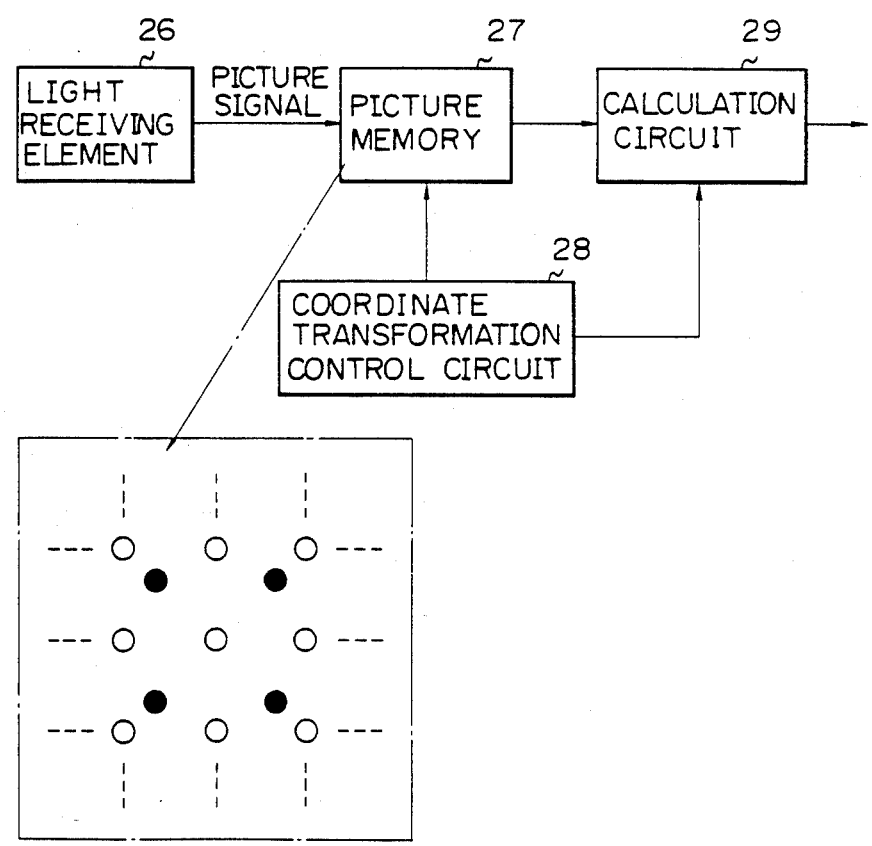
Figure 23:
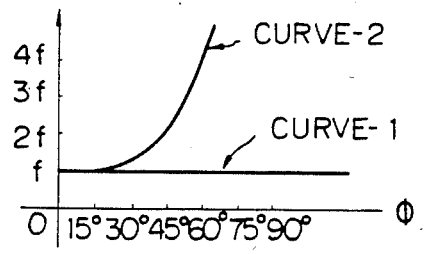

FIG. 21 shows representations for explaining a spherical camera; FIG. 22 is a block diagram of a coordinate transformation control type spherical camera; and FIG. 23 is a graph showing the characteristics of an equidistant projection lens.

The television camera has an equidistant projection lens and a light-receiving element having a uniform two-dimensional position resolution. The television camera may have a normal lens instead of the equidistant projection lens, with a flat light-receiving element having a uniform two-dimensional position resolution, and an electronic coordinate transformation section, wherein the coordinate data of the input picture may be transformed so as to substantially obtain the same results as with the equidistant projection lens.

The spherical camera is substantially the same as a camera having a pinhole 20 and a spherical light-receiving element 21. In practice, since the pinhole 20 cannot provide a sufficient amount of light and cannot provide adequate focusing, it is replaced with a lens system 24. In addition, since a spherical light-receiving element cannot be easily manufactured, a flat light-receiving element 23 is used. For this reason, as indicated by the dotted line, an ideal spherical plane 22 is deviated from the flat surface of the light-receiving element 23. The lens system 24 comprises a single lens or a plurality of lenses.

For example, a flat light-receiving element such as a metal-oxide semiconductor (MOS) or a charge coupled device (CCD) element has cells equidistantly arranged in a matrix form. The resolution is constant irrespective of the light-receiving position. A continuously flat light-receiving element such as a so-called vidicon also has a uniform two-dimensional position resolution. Therefore, the difference between the flat surface of the flat light-receiving element 23 and the ideal spherical plane 22 indicated by the dotted line must be corrected by the lens or lens system 24.

Assume that the height of the image focused on the focusing plane at a position away from the center of the lens 24 by the focal distance f is y, and that the angle of incidence of light with respect to the optical axis of the lens is $\theta$. The equation $y = f\tan\phi$ holds for in a normal lens. However, in order to focus the same image as that on the spherical light-receiving element 21 on the flat light-receiving element 23, a lens must be used to satisfy a linear projection relationship between the height y and the incident angle $\phi$, according to the equation: $y = f\phi$. The lens satisfying this equation is a fish-eye lens and is known as an equidistant projection lens.

Even if the special projection lens described above is not used, a normal lens or other projection lens is used to constitute the following spherical camera. This spherical camera comprises a light-receiving element 26, a picture memory 27, a coordinate transformation control circuit 28, and a calculation circuit 29, as shown in FIG. 22.

The light-receiving element 26 generates a signal obtained when a two-dimensional picture is sequentially one-dimensionally scanned. The output picture signal from the light-receiving element 26 is converted by an A/D converter (not shown). The digital picture signal is then temporarily stored in the picture memory 27. The coordinate transformation control circuit 28 controls the calculation circuit 29 for data write/read access with respect to the picture memory 27 and calculations of output data read out from the memory 27.

When the normal lens is used, a picture y' to be focused is represented by $y' = f\tan\phi$, derived from the equation $y = f\tan\phi$. Equation $y' = f\tan\phi$ is transformed to obtain the characteristics given by the equation $y = f\phi$. Substitution of $y' = f\tan\phi$ into $y = f\phi$ yields the equation $y = f\phi = f\tan^{-1}(y'/f)$. The coordinate transformation control circuit 28 and the calculation circuit 29 electronically perform the above-mentioned coordinate transformation.

The picture memory 27 stores picture data in one-to-one correspondence with the cells of the light-receiving element 26, as indicated by hollow dots in FIG. 22. Since the lens characteristics do not correspond to equation $y = f\phi$, the hollow dots are not plotted at equiangular intervals. The matrix dot corresponding to the equiangular interval is determined by the lens properties, as indicated by a black dot. The position of the black dot is determined by equation $y = f\tan^{-1}(y'/f)$. The position data of the black dot is interpolated by a weighted average corresponding to a distance in accordance with the adjacent four hollow dots. When a distance between the hollow dots is short, i.e., when the resolution of the light-receiving element 26 is sufficiently high, a value of a hollow dot near a black dot is approximated as an output.

The angle resolutions of the normal lens and the equidistant projection lens are illustrated in FIG. 23.

The angle resolution of the normal lens is derived such that equation $y = f\tan\phi$ is differentiated with $\phi$ as follows:

$$dy/d\phi = f/\cos^2\phi$$

The angle resolution of the equidistant projection lens is derived such that equation $y = f\phi$ is differentiated with $\phi$ as follows:

$$dy/d\phi = f$$

The values calculated from these two differentials are plotted as shown in FIG. 23. The angle resolution (CURVE-1) of the equidistant projection lens is constant irrespective of the incident angle $\phi$, and the angle resolution (CURVE-2) of the normal lens is decreased when the incident angle $\phi$ is decreased.

The spherical camera has the equidistant projection lens or an equivalent mechanism to have a uniform angle resolution irrespective of the incident angle and a visual field. When the spherical camera is used as an eye of a robot, three-dimensional measurement is accurately performed. Furthermore, since the visual field is large, wide-range visual information can be obtained. Therefore, a remote operator can feel as if he is watching an actual picture.

Operation of the System to Which a Mapping Processor is Applied

Spherical mapping three-dimensional measurement is performed on the basis of the image data supplied from the television camera 2.

The video signal from the television camera 2 as the spherical camera is supplied to the A/D converter 50. A digital picture signal from the A/D converter 50 is supplied to the contour extraction section 51. The section 51 extracts a contour component from the digital picture signal. The contour-extracted picture signal is supplied to the frame memory 52, and the picture detected by the television camera 2 is displayed on the television monitor 53. At the same time, the coordinate and weighting data of the extracted points are supplied to the original picture memory 54.

When the coordinate and weighting data are stored in the original picture memory 54, the mapping processor 4a reads out the coordinate and weighting data therefrom to generate a great circle given by the coordinate data of the extracted points as described with reference to FIG. 7. These coordinate data are weighted and stored in an internal mapping memory 42 in the mapping processor 4a. The mapping processor 4a sequentially reads out the coordinate and weighting data of the extracted points from the original picture memory 54 and writes in the mapping memory 42 thereof coordinate data representing the great circle in the same manner as described above. When the coordinate data of all the extracted points are stored in the mapping memory 42, the processor 4a searches for a peak point $S_S$, and the mapping memory 42 is updated. Thereafter, the contents of the mapping memory 42 are transferred to the mapping memory 55. Line extraction can be performed by the contents of the memory 55.

When the mapping results of the mapping processor 4a are stored in the mapping memory 55, the mapping processor 4b reads out coordinate data of the point $S_S$ from the memory 55. The coordinate data representing the corresponding great circle is sequentially written in the mapping memory thereof in the same manner as described above. It should be noted that the picture detected by the television camera 2 has a plurality of lines and that a plurality of peak points are stored as the mapping results in the mapping memory 55. When the mapping processor 4b writes a great circle plotted by all the peak points S in the mapping memory thereof in the same manner as described above, the peak point $S_S$ is searched, and the mapping memory is updated. In other words, mapping is performed using the coordinates of points S, thereby determining the three-dimensional directions of lines and an intersection therebetween. The mapping processor 4b transfers the contents of the mapping memory thereof to the mapping memory 56. In addition, the mapping processor 4c and the mapping memory 57 for storing the mapping results are provided for obtaining a point $S_{SS}$ in accordance with the contents of the mapping memory 56, thereby deriving planar information.

A series of operations of the mapping processors are performed such that the processor 61 in the recognition section 60 exchanges commands and data with the respective mapping processors through the parallel interface 58 and the bus 70.

In this manner, lines, their intersection and three-dimensional directions, and the polar direction defined by the lines are extracted by the three mapping processors. The mapping results of these processors are respectively stored in the mapping memories, and the processor 61 in the recognition section 60 reads out the contents from the three mapping memories through the bus 70 and discriminates the lines, their intersection, and the plane of the picture detected by the television camera 2. The object is reconstructed by the lines and the plane. The reconstructed data is compared with various object data stored in the floppy disk drive 66 and discriminated to constitute a specific object.

The recognition results are printed out at the printer 67 through the printer interface 64. When a robot controller is connected to the interface 63, the recognition results are supplied to the robot controller. The robot controller controls a robot such that the robot will not bump against an obstacle or will grasp a specific object.

From the description with reference to FIG. 20, it will be understood that the coordinate transformation can be carried out by using a camera positioned at the center of the sphere. The picture information extraction can be carried out, for example, by a translational movement of the camera. The measurement of a three-dimensional direction of a straight line, parallel lines, or a plane in space can be carried out by the translational movement of the camera. The detection of parallel lines in space and the measurement of the three-dimensional direction of a straight line or a plane in space with regard to the parallel lines can be carried out by the camera positioned at a fixed position.

Type of System Using Mapping by Hough Transformation

Figure 24A:
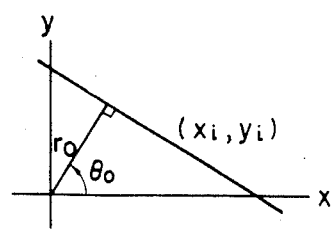
FIGS. 24 to 26 illustrate an embodiment in which mapping by Hough transformation is used.
Figure 24B:
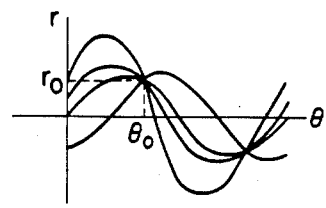
Figure 25B:
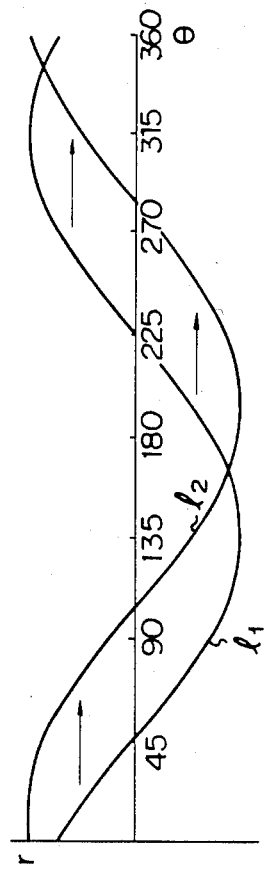
Figure 25A:
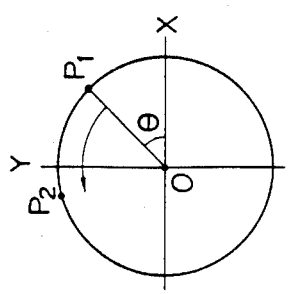
Figure 26B:
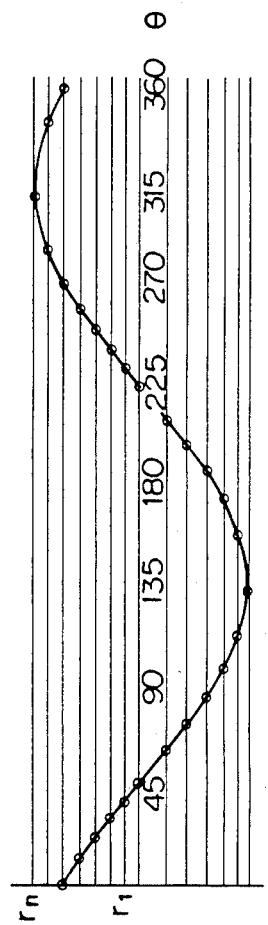
Figure 26A:
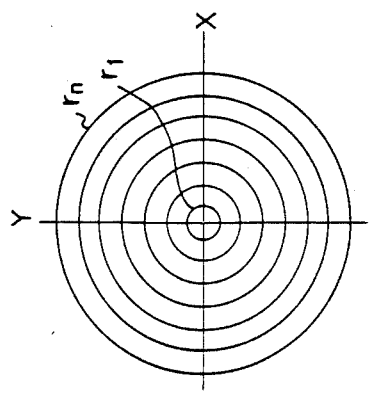

The present invention will be exemplified by mapping by the Hough transformation. The principle of the Hough transformation is illustrated in FIG. 24. FIGS. 25 and 26 illustrate a case where the present invention is applied to mapping by the Hough transformation.

As described with reference to FIG. 24, the Hough transformation transforms points (X,Y) on the X-Y coordinate system to a sine wave plane in accordance with equation $r = X\sin\theta + Y\cos\theta$.

The two-dimensional coordinates (X,Y) are mapped in polar coordinates $(r,\theta)$, that is, $$r = \sqrt{X^2 + Y^2}$$

$$\theta = \tan^{-1}(Y/X)$$

Points $P_1$ and $P_2$ plotted on the same concentric circle having the original 0 and the radius $|r|$ have different phases $\theta$. The sine wave $l_1$, of the mapping function of the point $P_1$ is shifted as shown in FIG. 25 similarly as the manner shown in FIG. 11 to obtain the sine wave $l_2$ as the mapping function of the point $P_2$. When the reference sine wave, having as the reference points intersections between the X-axis and the concentric circle, is provided, the sine waves of the points on the concentric circle can be obtained by shifting the reference sine wave.

As shown in FIG. 26, the X-Y coordinate plane is divided by concentric circles having radii $r_1$ to $r_n$ and is represented by polar coordinates $(r,\theta)$, thereby generating a mapping function in the same manner as described with the spherical transformation.

FIG. 26 shows a registration method of a reference sine wave for the Hough transformation. Similarly as the manner shown in FIG. 13, the longitudinal axis in a radial direction of the mapping plane is divided into the concentric circles having radii $r_1$ to $r_n$, and intersections, indicated by small circles, between the reference sine wave and the respective concentric circles are stored to register such a pattern. This pattern expression may be made by using a bit pattern or values, as addresses, of FIG. 13.

Generation and storage of Mapping Function Data by the Hough Transformation

Figure 27:
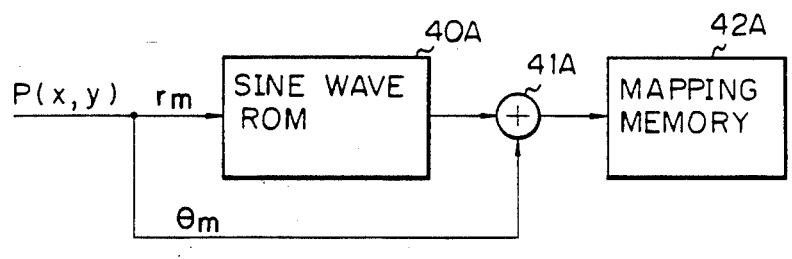
FIGS. 27 and 28 illustrate the generation and the storage of data of the mapping function by Hough transformation.

FIG. 27 is a block diagram of a circuit for generating mapping data for the Hough transformation. Reference numeral 40A denotes a reference sine wave ROM for storing coordinate data representing the intersections between the concentric circles and their reference sine waves of mapping functions, as shown in FIG. 26. Reference numeral 41A denotes an adder for adding a phase $\theta m$ of an input point to the corresponding intersecting coordinate data read out from the reference sine wave ROM 40A. Reference numeral 42A denotes a mapping memory whose address is accessed in response to an output from the adder 41A so as to store a corresponding sine wave pattern.

The operation of the system shown in FIG. 27 will be described hereinafter. The coordinates of the point $P(x,y)$ are transformed to polar coordinates by the equation described above. In other words, the point $P(x,y)$ is written by a radius $|r|$ of the corresponding concentric circle and a corresponding phase $\theta m$. The radius data $|r|$ is supplied to the reference sine wave ROM 40A which selects the corresponding reference sine wave pattern. Since the adder 41A also receives the phase data $\theta m$, the selected reference sine wave pattern is added to the phase data $\theta m$, thereby completing the coordinate transformation.

The reference sine wave pattern is shifted by the phase $\theta m$ to provide the sine wave pattern corresponding to the point P. The output from the adder 41A is supplied as an address signal to access the mapping memory 42A, thereby storing the sine wave pattern corresponding to the point P in the mapping memory 42A.

In this manner, the sine wave patterns of the respective points are generated by the reference sine wave ROM 40A on the basis of the reference sine wave pattern stored therein. The resultant sine wave patterns of the respective points are stored in the mapping memory 42A.

Similarly as the manner shown in FIGS. 16 and 17, distance data may be stored in place of the rotational angle data. In this case, a transformation ROM for transforming the phase $\theta m$ to a distance is provided. The outputs from the transformation ROM and the reference sine wave ROM 40A are supplied to the adder 41A, and an output from the adder 41A is used as a write address.

Figure 28:
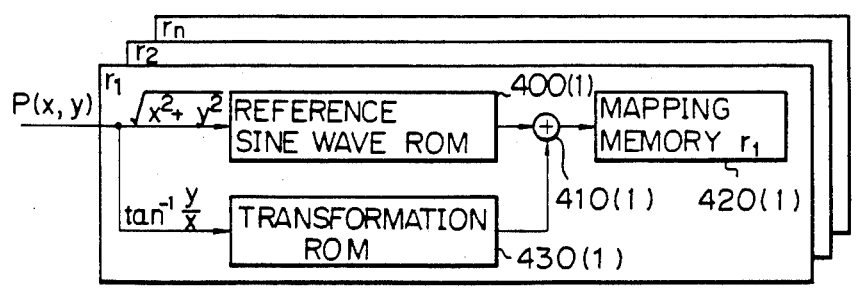

FIG. 28 shows another embodiment of a circuit for generating mapping function data by the Hough transformation, wherein parallel operation is performed.

As described above, the mapping memory is divided into mapping memories 420(1), 420(2), ... and 420(n) corresponding to the intersections of the reference sine wave pattern and the concentric circles $r_1, \ldots$ and $r_n$. Similarly, the reference sine wave ROM is also divided into ROMs 400(1), 400(2), ... and 400(n) corresponding to the respective concentric circles. Accordingly, the adder is divided into adders 410(1), 410(2), ... and 410(n), and the transformation RAM is divided into transformation RAMs 430(1), 430(2), ... and 430(n). With the above arrangement, generation and storage of the sine wave pattern as the mapping function can be performed in units of concentric circles with a parallel operation, thereby increasing the mapping rate.

Description of Problem of Giving Bandwidth to Mapping Function

Figure 29:
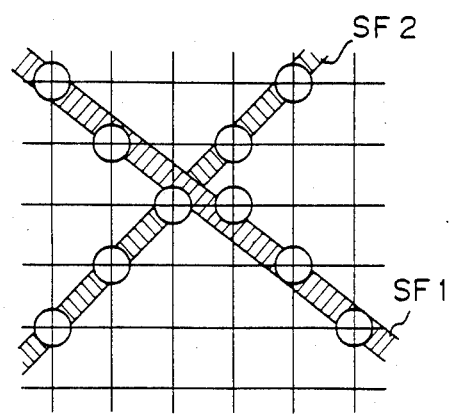
FIG. 29 illustrates the problem of giving a bandwidth to a mapping function.

The data extraction by mapping is essentially based on the fact that a quantization structure is provided to a mapping plane assigned with the mapping function, and only the intersections between the quantization structure frame and the mapping function are stored. For example, when the mapping plane has a quantization structure of an orthogonal coordinate system, as shown in FIG. 29, mapping functions $SF_1$ and $SF_2$ record intersections with the frame of this coordinate system. According to this method, however, it is difficult to properly record intersections on the mapping plane and to extract the intersections between the mapping functions $SF_1$ and $SF_2$ due to quantization errors on the mapping plane, even if these mapping functions intersect with each other. The reason why the intersection is not properly extracted is that only one point on each coordinate system frame is recorded for each mapping function. In order to solve this problem, a technique is required such that an intersecting portion between the coordinate system frame and the mapping function is not constituted by a bandwidth range, thereby causing each mapping function to record a plurality of points on the coordinate frame.

Embodiment of Giving Bandwidth to Mapping Function

Figure 30:
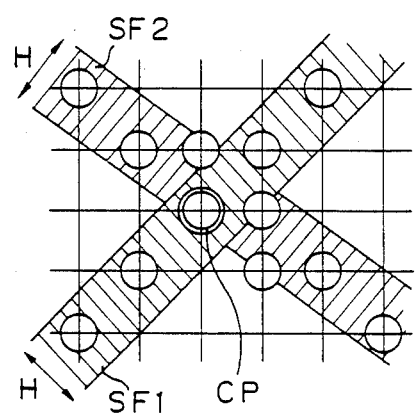

As shown in FIG. 30, a bandwidth H is given to the mapping functions $SF_1$ and $SF_2$ which are then written on the mapping plane. The intersection CP between the mapping functions $SF_1$ and $SF_2$ is defined by these functions. As indicated by a double circle, the weight at the intersection is greater than that at other portions, thereby allowing the intersection CP to be properly extracted.

Figure 31:
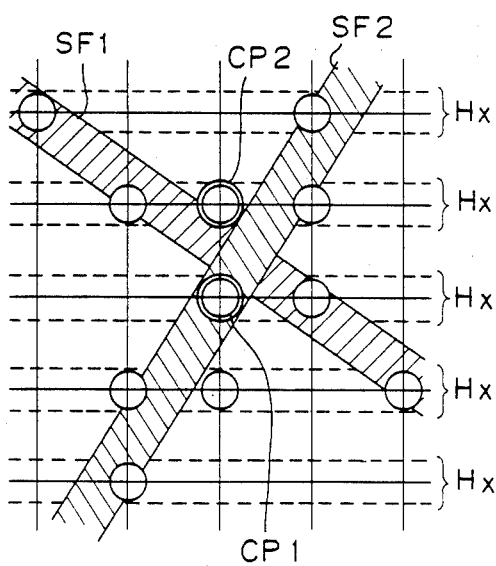

Another method is also proposed as shown in FIG. 31, wherein virtual widths $H_x$ are given to the frames, respectively. When the mapping functions $SF_1$ and $SF_2$ match with the frame having the width $H_x$, recording is performed within the corresponding frame. In this manner, recording is performed while the allowance width is given to the mapping function. The intersections of the mapping functions $SF_1$ and $SF_2$ are indicated by matrix points $CP_1$ and $CP_2$. The matrix points $CP_1$ and $CP_2$ respectively assigned to the mapping functions $SF_1$ and $SF_2$ are recorded on the mapping plane, thereby allowing the intersections to be easily extracted.

Figure 32:
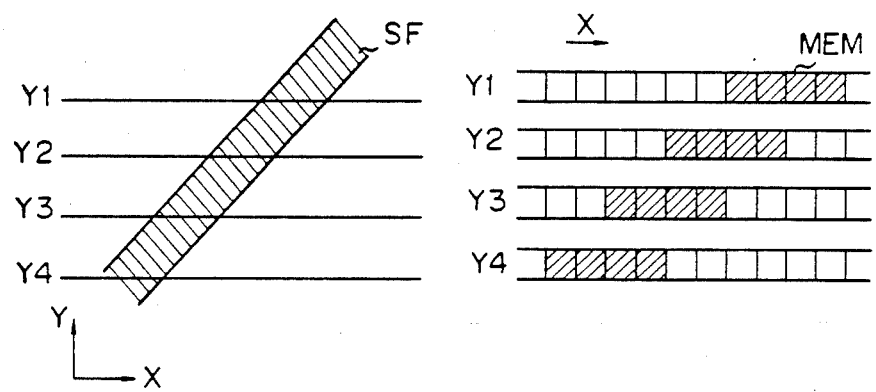

FIG. 32 shows a recording state of such a mapping plane. When the mapping function SF crosses lines $Y_1$ to $Y_4$ of the X-Y coordinate system, four bits which correspond to the X-direction width of the mapping function SF are stored in each of the coordinate frames $Y_1$ to $Y_4$ of the Y-axis in the X-Y coordinate system memory as the mapping plane. In this manner, the mapping function with the bandwidth is stored in the mapping plane. Each mapping function is recorded with the plurality of points in each of the Y-coordinate frames $Y_1$ to $Y_4$ crossing the corresponding mapping function, thereby allowing the intersections to be easily reproduced.

When the plurality of points are written, the write time is prolonged. Recording of the entire width data of the mapping function is not preferred in consideration of the execution rate and the number of data. An improved system will be described with reference to FIGS. 33, 34, and 35.

As shown in FIG. 33, assume that a coordinate frame $Y_n$ corresponding to a Y-coordinate in the X-Y coordinate system has a width of $X_l$ to $X_n$. When all the width data $X_l$ to $X_n$ is written, the corresponding execution rate and the memory capacity are required. In order to avoid this, only end points $X_l$ and $X_n$ are recorded. When the weight of the mapping function is defined as "1", the weighted start data is assigned as "+1" to the start point $X_l$, and the weighted end data is assigned as "−1" to the end point $X_n$. In other words, the values of the points $X_l$ to $X_n$ are differentiated, and the results are assigned to the start and end points. In this manner, data storage is limited to that of two points irrespective of the width of the frame. Therefore, the increase of the execution rate and the memory capacity can be minimized. In order to reproduce the width consisting of the points $X_l$ to $X_n$, the values of the points $X_l$ and $X_n$ are sequentially integrated from the left, thereby reproducing the weight level as the RESULT OF INTEGRATION.

FIG. 34 shows a case wherein the start and end points of a plurality of mapping functions are written in the same manner as described above. Points $X_l$, $X_{l+1}$, $X_m$, $X_{n-1}$, and $X_n$ of the mapping function $SF_1$ and points $X_{l+1}$, $X_m$ and $X_{n-1}$ of the mapping function $SF_2$ are written along the coordinate frame $Y_n$. The weight of each of the points $X_{l+1}$, $X_m$ and $X_{n-1}$ is given as "2". The two end points $X$ and $X_{n-1}$ of the mapping function are respectively assigned with "+1" and "−1", and the two end points $X_{l+1}$ and $X_n$ of the mapping functions $SF_2$ are respectively assigned with "+1" and "−1". When the data of the points is sequentially integrated from the left points, the weight level is reproduced as the RESULT OF INTEGRATION.

FIG. 35 shows a case wherein the above operation is applied to a multivalue weight level. When a mapping function $SF_1$ of a weight $w_1$ intersects with a mapping function $SF_2$ at the coordinate frame $Y_n$ as shown in PART-1 of FIG. 35, the state of the coordinate frame $Y_n$ is given as shown in PART-2 of FIG. 35. By using end point recording, the start point of the mapping function $SF_1$, the end point of the mapping function $SF_1$, the start point of the mapping function $SF_2$, the end point of the mapping function $SF_1$, and the end point of the mapping function $SF_2$ are respectively assigned with values "+$w_1$", "+$w_2$", "−$w_1$", and "−$w_2$", as shown in PART-3 of FIG. 35.

Instead of writing the weight data for the end points in FIGS. 33 to 35, the weight value, of a region between the start and end points and a region size, i.e., the number of bits between the start and end points, may be written in the start points.

Figure 36:
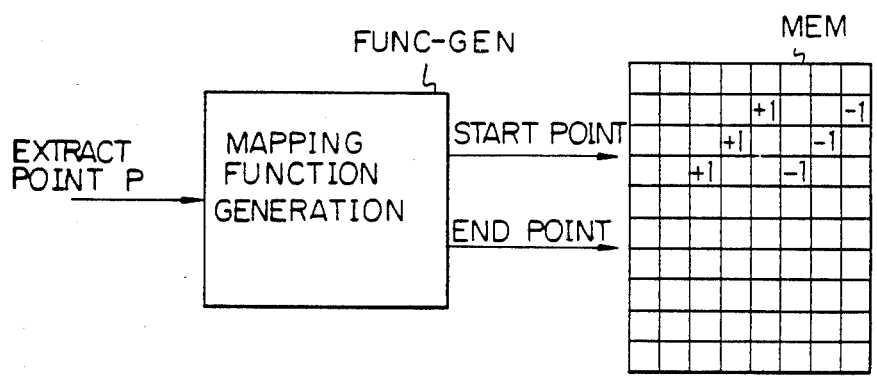
Figure 42A:
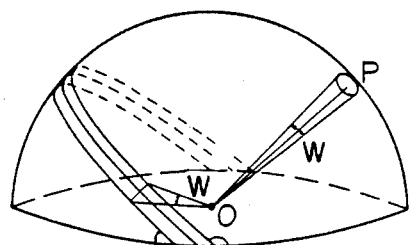
Figure 42B:
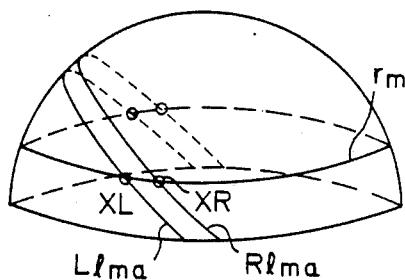
Figure 42C:
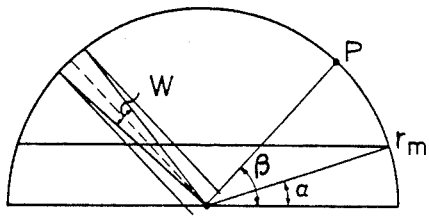
Figure 42D:
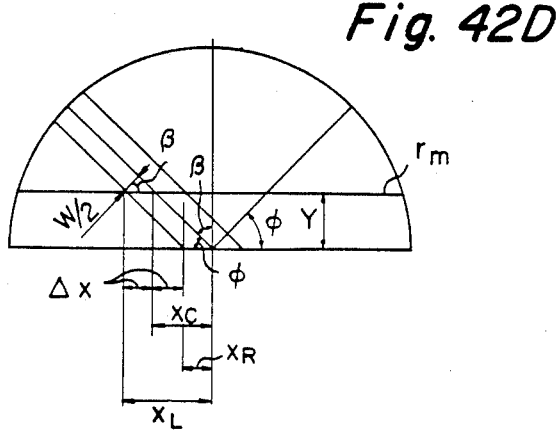

FIG. 36 is a block diagram of a circuit for realizing end point recording of FIGS. 33 to 35. This circuit comprises a mapping function generation circuit FUNC-GEN and a mapping memory MEM. The mapping function generation circuit FUNC-GEN generates a mapping function corresponding to an extract point P and stores coordinate data of the start and end points of the above-mentioned width of each mapping function for each of the coordinate frames $Y_1$ to $Y_n$.

The operation of the functional block shown in FIG. 36 will be described hereinafter. A mapping function corresponding to the coordinates of each extract point P is stored in the mapping function generation circuit 11. When the extract point P is entered, the corresponding mapping function is selected. The coordinates representing the start and end points of the selected mapping function are sequentially supplied to the mapping memory MEM. The start and end data are stored in the corresponding coordinate memory area in the mapping memory MEM. It should be noted that the weighted end data is also written when the mapping function is weighted.

The effect of the system shown in FIG. 36 will be described with reference to FIG. 37. A case will be described wherein three mapping functions intersect with each other in the coordinate frame $Y_n$. The first illustration shows conventional mapping function writing. The weight level of the mapping function is a relatively smooth curve when the mapping function is written in the coordinate frame $Y_n$. It is thus difficult to detect the peak position (WEIGHT LEVEL, CASE-1). When the allowance width is provided to the mapping function, the peak level is increased near the intersection as in the second illustration, and the slope is relatively steep, thereby simplifying peak level detection (WEIGHT LEVEL, CASE-2). The third illustration shows another peak value detection to be described later (WEIGHT LEVEL, CASE-3).

Embodiment of Giving Bandwidth to and Suppression Regions Mapping Function

Another embodiment will be described with reference to FIGS. 38 to 40. As shown in PART-1 and PART-2 of FIG. 38, suppression regions SFa and SFb having a polarity opposite to the mapping function SF are provided at two sides of the function SF. In other words, a function is produced such that the suppression regions SFa and SFb are added to the width inherently given to the function SF.

When a plurality of mapping functions are used, each having the width and the suppression regions intersecting with each other, as shown in PART-3 of FIG. 38, the effect of the width is provided at the intersection, i.e., the crossing point. However, the mapping functions cancel each other by means of the suppression regions around the intersection CP, thereby obtaining the mapping result with an emphasized intersection. Since the mapping function SF has a bandwidth and interferes with another mapping function with a bandwidth, writing of an excessive portion around the intersection is performed. In order to prevent such excessive writing, the suppression regions are provided. In PART-3 of FIG. 38, cancelling is performed in the dotted regions by the suppression regions around the intersection CP.

When the suppression regions SFa and SFb each having the same width as that of the bandwidth of the function are provided, as shown in PART-1 of FIG. 38, each suppression region is weighted by $-w/2$ while the region SF is weighted by w, thereby cancelling the effect of the increment of the weight of the mapping function SF.

As shown in CASE-3 of FIG. 37, according to this system, the suppression regions decrease the offset level as compared with the mapping function having only the bandwidth, and the intersection is further emphasized, thereby obtaining a steep peak. Therefore, the intersection can be further easily extracted.

The writing of the mapping function with the suppression regions will be described with reference to FIG. 39. As shown in the first write pattern of FIG. 39, the left suppression region SFa added to the mapping function at the coordinate frame $Y_n$ is defined by points X to $X_{m-1}$, and the right suppression region SFb thereof is defined by points $X_{p+1}$ to $X_n$. These points of the right and left suppression regions are weighted by $-a$. The original region SF of the mapping function is defined by points $X_m$ to $X_p$ which are weighted by b. All the points are not written in consideration of the write rate and the number of data to be stored. In practice, as shown in the second write pattern of FIG. 39, only four points are recorded by differentiating the first write pattern. In other words, the start point $X_l$ of the suppression region SFa is weighted by "$-a$", the start point $X_m$ of the mapping function SF is weighted by "$a+b$", the end point $X_p$ of the mapping function SF is weighted by "$-(a+b)$", and the end point of the suppression region SFb is weighted by "$a$". It should be noted that since the start point of the region SF of the mapping function is located next to the end point of the suppression point SFa, the end point of suppression point SFa is not recorded; instead, the differentiated value of the start point of the region SF of the mapping function is written. It should be also noted that the differentiated value of the end point of the region SF is written as the start point of the suppression region SFb in accordance with the same principle described above. For the mapping function, a start point address of the suppression region SFa, the start and end point addresses of the width region SF of the mapping function and the end point address of the suppression region SFb are generated, and the differentiated values are separately supplied to and written in the mapping memory.

FIG. 40 is a block diagram showing a system for realizing the above-mentioned scheme. This system comprises a mapping function generation circuit FUNC-GEN and a mapping memory MEM. The mapping function generation circuit FUNC-GEN stores mapping functions respectively corresponding to the extract points P. More particularly, the circuit FUNC-GEN stores the start address $X_l$ of the suppression region SFa of the mapping function at each of the coordinate frames $Y_l$ to $Y_n$, the start address $X_m$ of the width region, the end address $X_p$ of the width region, and the end address $X_n$ of the suppression region SFb.

The operation of the functional block shown in FIG. 40 will be described hereinafter. When the coordinate data of the extract point P is supplied to the mapping function generation circuit FUNC-GEN, the corresponding mapping function is selected, and the start address $X_l$, the start and end addresses $X_m$ and $X_p$, and the end address $X_n$ are supplied to the mapping memory MEM, thereby writing the differentiated values therein at the addresses corresponding to the above-mentioned address data supplied thereto.

Embodiment of Applying Bandwidth to Process of a Generation of Mapping Function

An embodiment of applying a bandwidth to the process of generation of a mapping function which cooperates with spherical projection in the system described with reference to FIGS. 30 to 37 will be described in FIGS. 41 to 43.

In the system described with reference to FIGS. 30 to 37, the bandwidth is used in the mapping function, and the end points are recorded to store the mapping function in the mapping memory. Therefore, two mapping functions $R_{lma}$ and $L_{lma}$ which represent the end points as the extract point of the great circle as the mapping function are to be generated. In other words, the locus addresses of the two end points on each concentric circuit are to be generated. The reference mapping functions each showing the two end points as the reference points on the corresponding concentric circle are stored. The reference mapping function is shifted on the polar coordinate system in accordance with a distance L between the reference point and the extract point, thereby generating the two mapping functions for the extract point.

FIG. 42 shows representations for explaining generation of the two mapping functions.

As shown in PART-1 of FIG. 42, assume that two mapping functions corresponding to the extract point P are defined as $L_{lma}$ and $R_{lma}$ and that a distance, i.e., a width therebetween is defined as W.

As shown in PART-2 of FIG. 42, locus addresses of the mapping functions $R_{lma}$ and $L_{lma}$ on the identical concentric circle $r_m$ are defined as $X_R$ and $X_L$, respectively. As shown in PART-3 of FIG. 42, an angle of the extract point P between a line OP and the horizontal axis where O is the origin of the semisphere is defined as $\phi$ and the angle between the circle $r_m$ and the horizontal axis is defined as $\alpha$. Under these definitions, the height up to the concentric circle $r_m$ with respect to the horizontal axis is given as a Y address, and the locus addresses $(X_R,Y)$ and $(X_L,Y)$ are calculated where $Y = \sin\alpha$ $X_C = Y/\tan\phi = Y/\tan(/2-\phi) = Y\tan\phi - \sin\alpha\tan\phi$ $\Delta x\sin = \sin(W/2)/\cos\phi$ therefore, $X_R = X_C - X = \sin\alpha\tan\phi - \sin(W/2)/\cos\phi$ $X_L = X_C + X = \sin\alpha\tan\phi + \sin(W/2)/\cos\phi$ When the angles $\phi$ and $\alpha$ and the width W of the predetermined mapping function are given, the locus addresses on each concentric circle are solely defined by the X-Y coordinates suitably adapted for the memory. The locus addresses of the two reference mapping functions corresponding to the reference point are calculated by the above equations, and the resultant data are stored in the mapping function generation memory.

FIG. 43 is a block diagram of a system for realizing the above scheme described with reference to FIG. 41. In this system, reference numerals 4000(1) and 4000(2) denote reference great circle ROMs. The ROM 4000(1) stores the reference mapping function $R_{lma}$ representing one end point of the reference mapping function with the bandwidth with respect to the reference point of the identical concentric circle. The ROM 4000(2) stores the reference mapping function $L_{lmba}$ representing the other end point thereof. The data in the ROMs 4000(1) and 4000(2) are stored in the form of $(X_L,Y)$ and $(X_R,Y)$, respectively. Reference numerals 4100(1) and 4100(2) denote adders. The adder 4100(1) adds the output from the ROM 4000(1) and an output L from a rotation ROM, which will be described in detail later. The adder 4100(2) adds the output from the ROM 4000(2) and the output L from the rotation ROM. Reference numeral 42 denotes a mapping memory for storing the mapping functions in the X-Y coordinate system. A rotation ROM 43 transforms the rotational position $\theta_m$ of the extract point with respect to the reference point into the distance L.

The operation of the system shown in FIG. 43 will be described hereinafter. The coordinates of the extract point P are given as the circle $r_m$ and the angle $\theta_m$ with respect to the reference point. The circle data r for the point P is supplied to the reference mapping function ROM's 4000(1) and 4000(2) which respectively select the mapping functions $R_{lma}$ and $L_{lma}$ corresponding to the reference point of the concentric circle $r_m$. The locus addresses $(X_L,Y)$ and $(X_R,Y)$ of each concentric circle are supplied to the adders 4100(1) and 4100(2), respectively. The rotational angle data $\theta_m$ of the point P is supplied to the rotation ROM 43 and is transformed into the distance L. The distance data L is supplied to the adders 4100(1) and 4100(2). The adders 4100(1) and 4100(2) perform additions $X_L+L$ and $X_R+L$, respectively. The outputs $(X_L+L,Y)$ and $(X_R+L,Y)$ from the adders 4100(1) and 4100(2) are supplied as write address data to the mapping memory 42. In the mapping memory 42, data "+1" and "−1" are stored at the addresses accessed by the write address data, respectively. Similarly, the locus addresses of the respective concentric circles are shifted in the same manner as described above, and the corresponding data is stored in the mapping memory 42, thereby completing writing of the great circle of the mapping function of the extract point P which has the bandwidth. When the mapping function of one extract point P which has the bandwidth is completely written, the next mapping function of the next extract point of interest is written in the same manner as described above.

Embodiment of Giving Bandwidth and Suppression Region to Mapping Function

An application of mapping function generation using spherical projection in the system described with reference to FIGS. 38 to 40 will be described with reference to FIGS. 44 and 45.

Figure 44A:
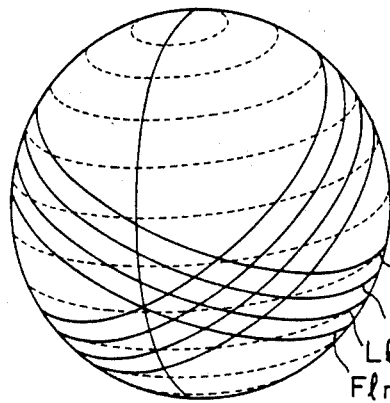
FIGS. 44 and 45 illustrate a process of production of a mapping function wherein a bandwidth and suppression regions are given.
Figure 44B:
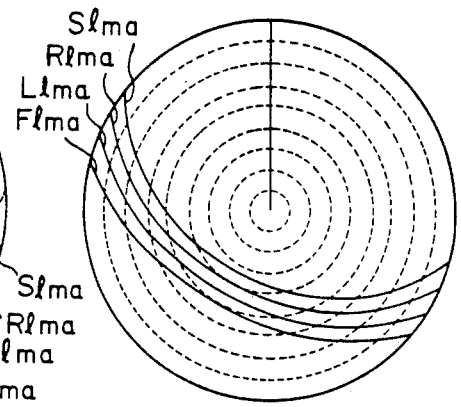

Referring to FIG. 44, suppression regions are provided at two sides of the width region of the mapping function, and the end points are generated to record such a mapping function. In addition to generation of the two mapping functions $R_{lma}$ and $L_{lma}$ representing the end points of the width region, two other mapping functions $S_{lma}$ and $F_{lma}$ representing the end points of the suppression regions are generated. Therefore, the locus addresses of these mapping functions which are plotted on each concentric circle are generated. Only four reference mapping functions with respect to the reference point of each concentric circle are stored and are shifted in accordance with a distance L between the reference point and the extract point, thereby generating a mapping function having the width at the extract point and the suppression regions. In other words, the four functions $R_{lma}$, $L_{lma}$, $S_{lma}$, and $F_{lma}$ are generated.

Figure 45:
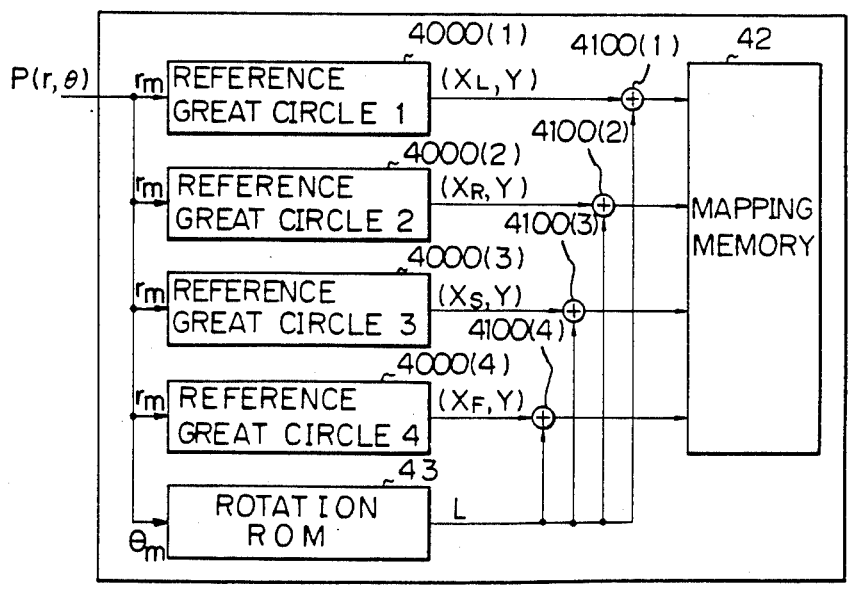

FIG. 45 is a block diagram showing a system for realizing the scheme described with reference to FIG. 44. Referring to FIG. 45, reference numerals 4000(3) and 4000(4) denote reference mapping function ROM's which respectively store the mapping functions $S_{lma}$ and $F_{lma}$ in the same manner as the ROM's 4000(1) and 4000(2) so as to control the suppression regions. Reference numerals 4100(3) and 4100(4) denote adders corresponding to the ROM's 4000(3) and 4000(4), respectively. The adders 4100(3) and 4100(4) are arranged in the same manner as the adders 4100(1) and 4100(2), respectively.

The operation of the system shown in FIG. 45 will be described hereinafter. The coordinates of the extract point P are given as the polar coordinates $(r_m,\theta_m)$ to the reference mapping function ROM's 4000(1), 4000(2), 4000(3), and 4000(4). The rotational angle $\theta$ is supplied to the rotation ROM 43. The end addresses $(X_L,Y)$ and $(X_R,Y)$ of the width region of the mapping function corresponding to the reference point of the concentric circle r are read out from the reference mapping function ROMs 4000(3) and 4000(4), respectively. Addresses $(X_S,Y)$ and $(X_F,Y)$ of the reference mapping functions $S_{lma}$ and $F_{lma}$ of the suppression regions are read out from the reference mapping function ROMS 4000(3) and 4000(4). The adders 4100(1) to 4100(4) perform additions of $X_L+L$, $X_R+L$, $X_S+L$ and $X_F+L$. The outputs $(X_L+L,Y)$, $(X_R+L,Y)$, $(X_S+L,Y)$ and $(X_F+L,Y)$ from the adders 4100(1) to 4100(4) are supplied as write address data to the mapping memory 42. In the mapping memory 42, data "a+b", "−(a+b)", "−a" and "+a" are respectively written at addresses accessed by the write address data $(X_L+L,Y)$, $(X_R+L,Y)$, $(X_S+L,Y)$ and $(X_F+L,Y)$.

The locus addresses are shifted for each concentric circle and are written in the mapping memory 42, thereby writing the mapping function which corresponds to the extract point P and which has the bandwidth and the suppression regions.

When the mapping function which corresponds to one extract point and which has the bandwidth and the suppression regions is completely written, the mapping function of the next extract point of interest will be written in the same manner as described above.

Figure 46:
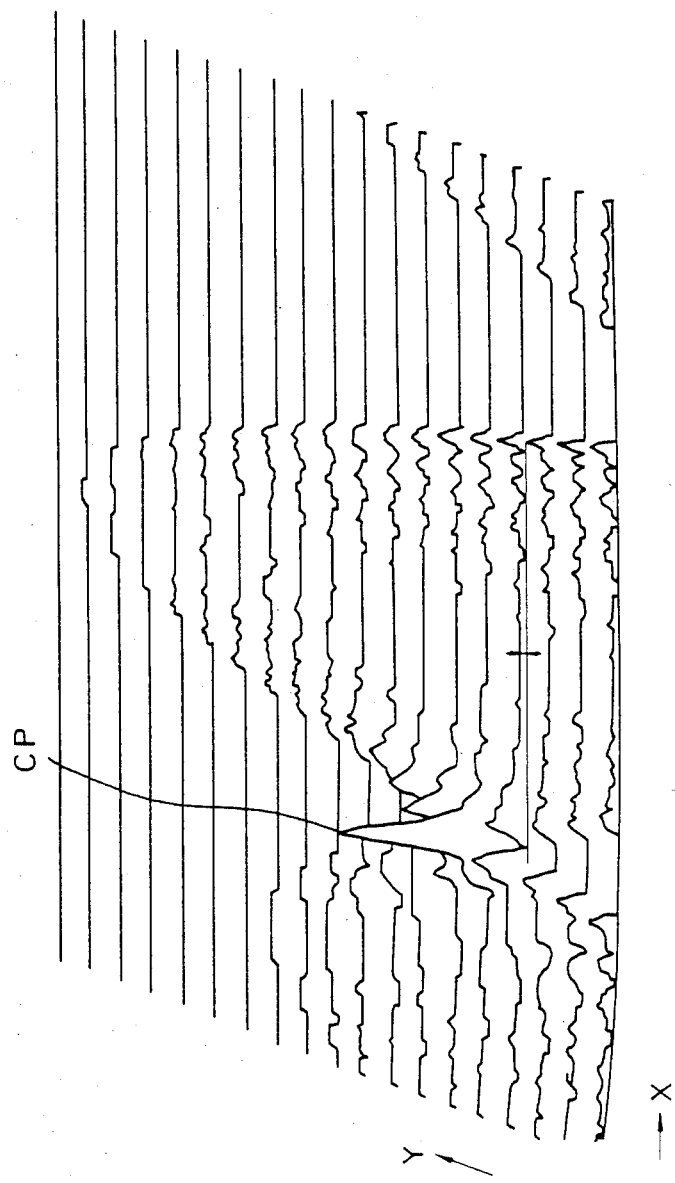
FIGS. 46 and 47 show examples of the memory data stored in a mapping function memory.
Figure 47:
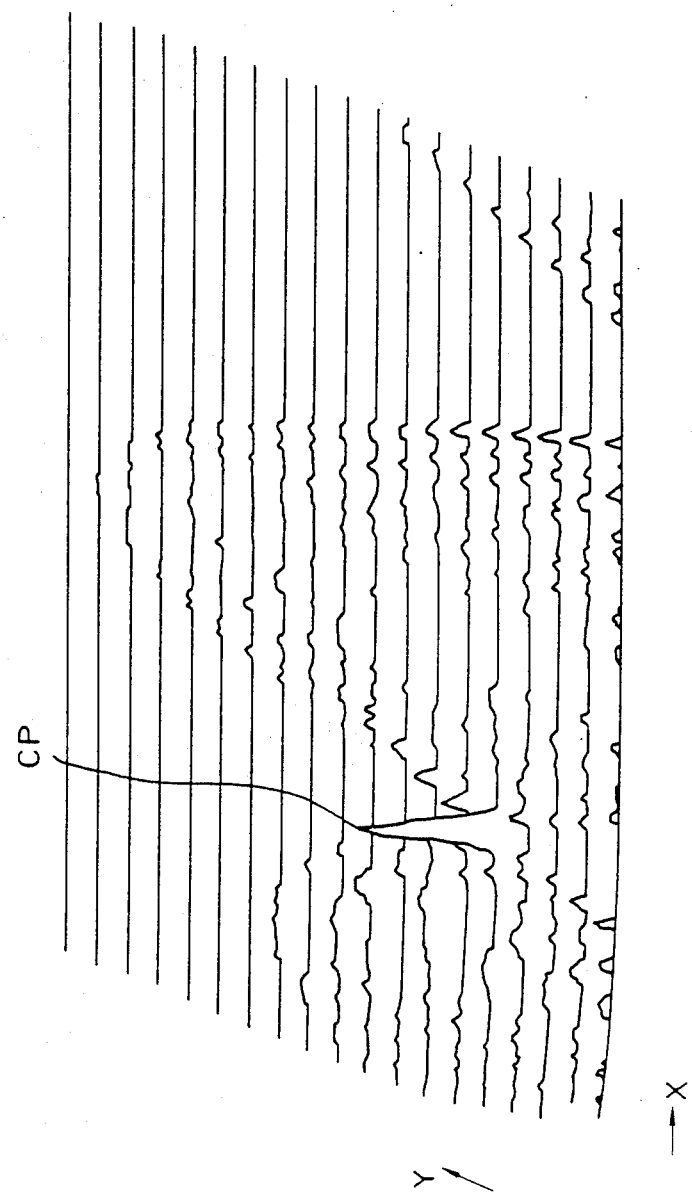

FIG. 46 shows the state of the mapping memory for storing the mapping functions by the system of FIG. 43. FIG. 47 shows the state of the mapping memory for storing the mapping function by the system shown in FIG. 45.

The peak point can be easily extracted as the intersection CP with a sufficiently high weight level, as shown in FIG. 46. In the case of FIG. 46, the peak value is further emphasized and made steep, thereby allowing the intersection CP to be easily extracted.

Figure 48:
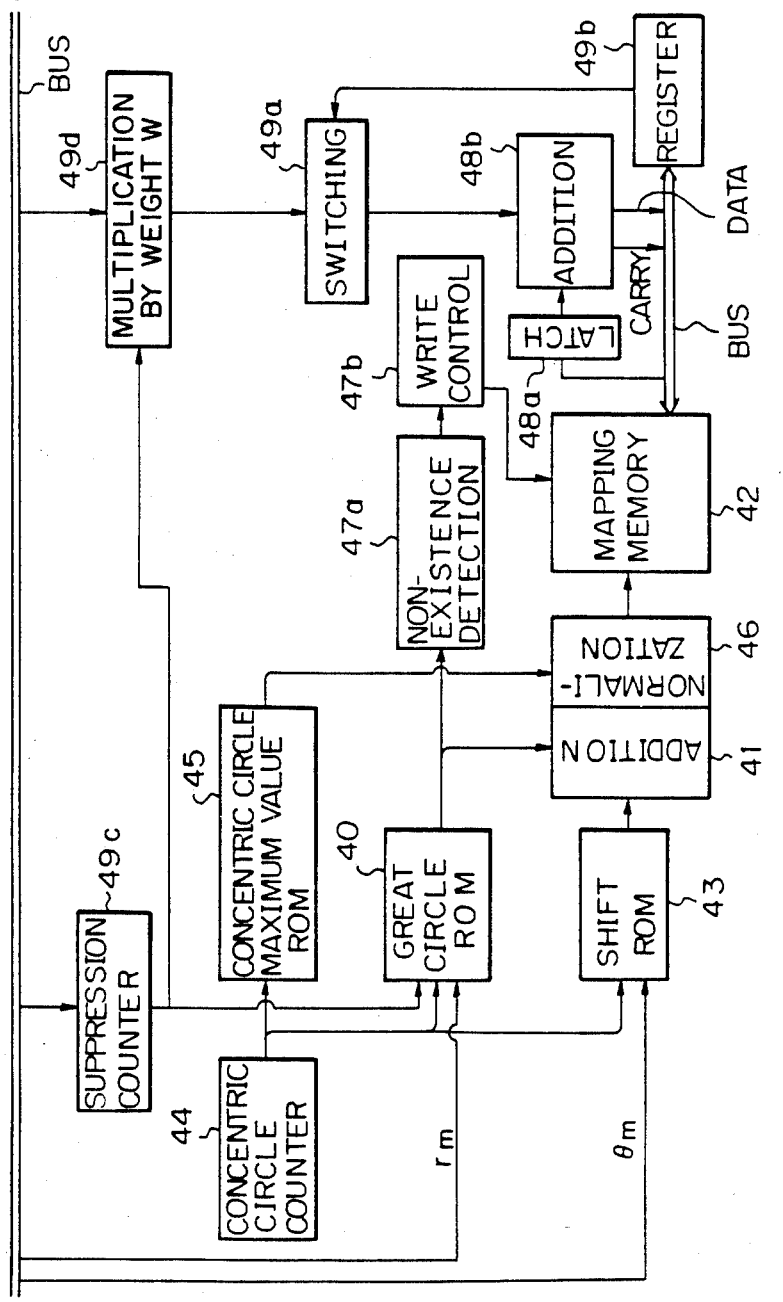
FIG. 48 shows an example of a mapping processor for giving a bandwidth and suppression regions to a mapping function.
Figure 49A:
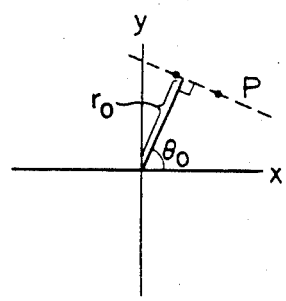
FIGS. 49 to 52 illustrate an example of the giving the bandwidth and the suppression regions to a mapping function by Hough transformation.
Figure 49B:
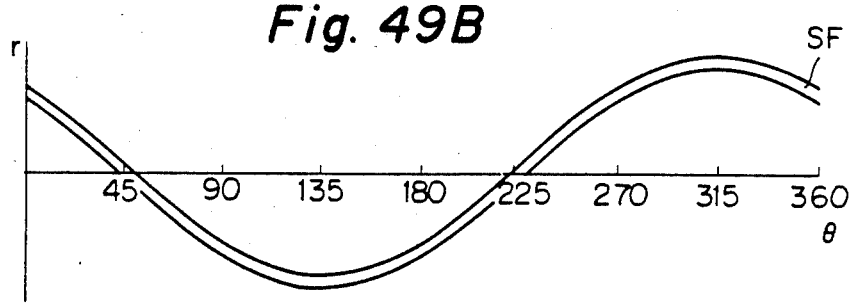
Figure 49C:
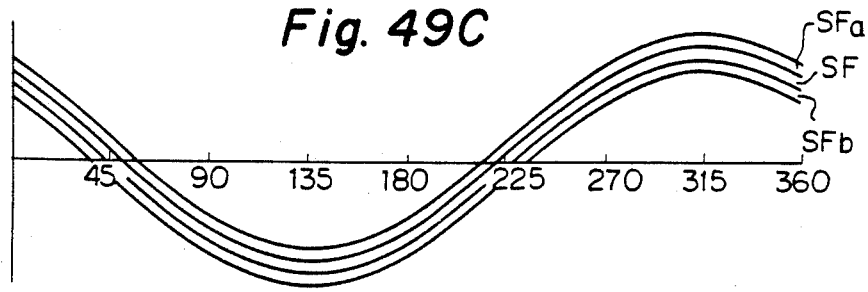
Figure 50B:
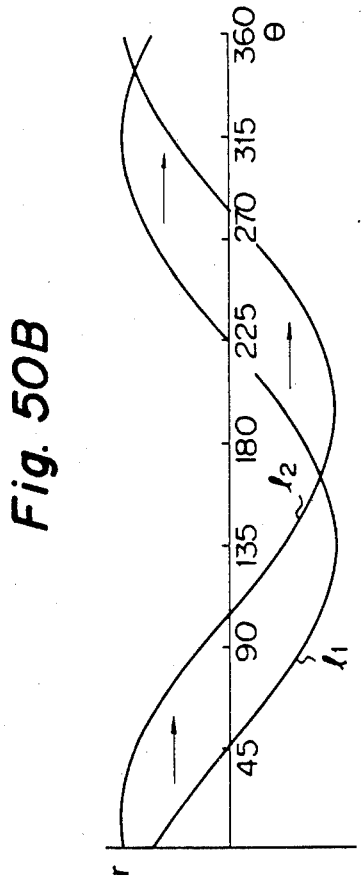
Figure 50A:
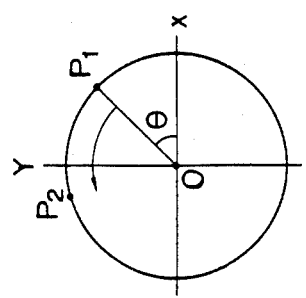
Figure 51B:
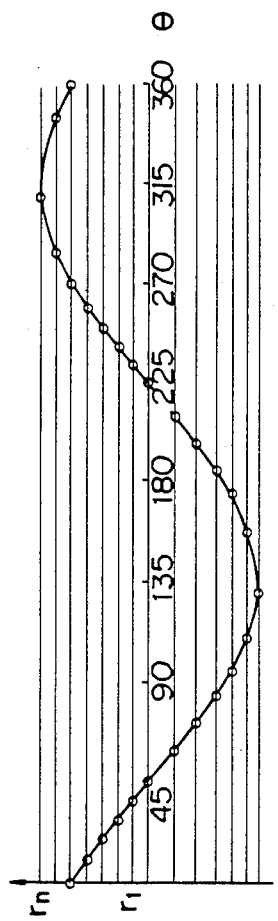
Figure 51A:
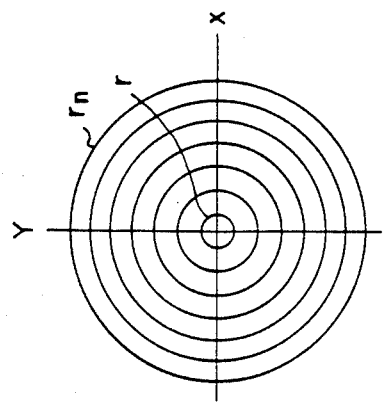

Example of Mapping Processor for Giving Bandwidth and Suppression Regions to Mapping Function An example of a mapping processor for realizing the above-mentioned scheme is shown in FIG. 48. Reference numeral 44 denotes a concentric circle counter for sequentially generating addresses $Y_1$ to $Y_m$ of the concentric circles with radii $r_1$ to $r_m$. The address data from the concentric circle counter 44 is supplied to a great circle ROM 40, a shift value ROM 43, or the like. Reference numeral 45 denotes a concentric circle maximum value ROM for storing a maximum value of the concentric circles along the rotational direction since the number of concentric circles varies under the assumption that the polar coordinates are given in the form of ($r_m$,L). A maximum value is read out from the concentric circle maximum value ROM 45 in response to the address data from the concentric circle counter 44. Reference numeral 46 denotes a normalization circuit for normalizing an output from an adder 41 which calculates a sum of the outputs of the great circle ROM 40 and the shift ROM 43 when the sum exceeds 360°, i.e., the maximum value of the concentric value with respect to the reference point. The maximum value of the data from the concentric circle maximum value ROM 45 is normalized as the rotational angle of 360°. Reference numeral 47a denotes a non-existence detection circuit. Since a non-existent value such as "512" exceeding the maximum value, e.g., "460" of the concentric circuit having no intersections with the reference great circle is written in the great circle ROM 40, the non-existence detection circuit 47a monitors the output from the great circle ROM 40. When the output from a ROM 40 represents the non-existent value, the circuit 47a generates a write inhibit signal since the corresponding concentric circle does not have intersections. Reference numeral 47b denotes a write control circuit for inhibiting the write access of the mapping memory 42 which is designated by the write address data from the normalization circuit 46 in response to the write inhibit signal generated from the non-existence detection circuit 47a. Reference numeral 48a denotes a latch circuit for latching the contents read out from the mapping memory 42. Reference numeral 48b denotes an adder for adding the contents of the latch circuit 48a and a sum generated from a switching circuit which will be described below. The resultant sum is stored in the mapping memory 42 through a bus BUS. A switching circuit 49a selectively supplies the weight W of the point P from the bus BUS or the value generated from an integrating register 49b, which will be described below, to the adder 48b. The integrating register 49b integrates the differentiated end point data. Reference numeral 49c denotes a suppression counter for generating the above-mentioned four addresses so as to generate the suppression regions SFa an SFb. Reference numeral 49b denotes a multiplier for multiplying the weight W from the bus BUS with $-\frac{1}{2}$, $-3/2$, or $\frac{1}{2}$ in response to the output from the suppression counter 49c.

The operation of the system shown in FIG. 48 will be described hereinafter. Coordinates ($r_m$, $\theta_m$) and a weight W of each extract point are generated from a memory (not shown). The great circle ROM 40 is the same memory constituted by the ROM's 4000(1) to 4000(4) (FIG. 45). The ROM 40 stores the mapping function which has the bandwidth and the suppression region. More particularly, the ROM 40 stores the four address data. These four address data are sequentially read out from the ROM 40 in response to the output from the counter 49c. The coordinate $r_m$ along the direction for the concentric circle is supplied to the great circle ROM 40, and the four reference great circles $S_{lma}$, $R_{lma}$, $L_{lma}$ and $F_{lma}$ corresponding to the coordinate $r_m$ are selected. The coordinate $\theta_m$ along the rotation direction is supplied to the shift ROM 43, and shift distances $L_m$ corresponding to the coordinate $\theta_m$ are selected. The concentric circle counter 44 sequentially generates address data of each concentric circle. This address data is supplied to the concentric circle maximum value ROM 45, the great circle ROM 40, and the shift ROM 43. The maximum value of the corresponding concentric circle is generated from the concentric circle maximum value ROM 45. The address data as the intersections between the concentric circle and the four reference great circles $l_m$ is sequentially read out from the great circle ROM 40 in response to the outputs from the suppression counter 49. The shift distance among the distances $L_m$ which corresponds to the concentric circle is read out from the shift ROM 43. Therefore, the adder 41 adds the four intersection coordinates generated from the great circle ROM 40 and the shift distance generated from the shift ROM 43. A sum from the adder 41 is supplied to the normalization circuit 46. The circuit 46 compares the maximum value read out from the concentric circle maximum value ROM 45 with the sum generated from the adder 41. When the sum is smaller than the maximum value, the sum is supplied as the write address data to the mapping memory 42. However, when the sum value is larger than the maximum value, a value "sum value-maximum value" is supplied as the write address data to the mapping memory 42. The four intersection coordinates from the ROM 40 are also supplied to the non-existence detection circuit 47a. When the circuit 47a detects any non-existent value among the intersection coordinates, the circuit 47a determines that the corresponding concentric circle does not have any intersections. The write inhibit signal is supplied from the non-existent detection circuit 47a to the write control circuit 47b. The circuit 47b inhibits writing of the mapping memory 42 at the designated address. However, when the write inhibit signal is not generated, the corresponding data is stored at the address of the mapping memory 42 which is accessed by the address data.

In order to weight the storage, the content at the accessed write address is read out from the mapping memory 42. The readout data is latched by the latch circuit 48a through the bus BUS. The multiplier 49d supplies $-w/2$, $3w/2$, $-3w/2$, and $w/2$ to the switching circuit 49a to weight the end points $X_l$, $X_m$, $X_p$, and $X_n$ shown in FIG. 39 in accordance with the outputs from the suppression counter 49c. The switching circuit 49a is operated to supply the outputs from the multiplier 49d to the adder 48b. The adder 48b adds the contents of the latch 48a and the outputs from the multiplier 49d, and the addition results are sent onto the bus BUS and stored in the corresponding memory area of the mapping memory 42. The multiplier 49d sequentially generates output $-w/2$, $3w/2$, $-3w/2$, and $w/2$ to the suppression counter 49c in response to the output from the suppression counter 49c. The address data of each end point for the great circle ROM 40 is sequentially updated in response to the output from the suppression counter 49c. The outputs from the adders 41 are then sequentially stored in the mapping memory 42, and at the same time are stored in the latch circuit 48a, thus being sequentially synchronized with the outputs generated from the multiplier 49d. Therefore, the adder 48b calculates a sum of the content of the point $X_l$ as the start point of the suppression region and the output $-w/2$, and the resultant sum is written at an address of the mapping memory 42 which corresponds to the start point $X_l$. The adder 48b adds the content of the point $X_m$ as the start point of the width region and the output $3w/2$, and the resultant sum is written at an address of the mapping memory 42 which corresponds to the start point $X_m$. Similarly, the content of the point $X_p$ as the end point of the width region is added to the output −3w/2, and the resultant sum is stored at an address of the mapping memory 42 which corresponds to the end point $X_p$. Finally, the content of the point $X_n$ is added to the output w/2, and the resultant sum is stored at an address of the mapping memory 42 which corresponds to the end point $X_n$.

When these four end points of one concentric circle are written in the mapping memory 42, the count of the concentric circle counter 44 is updated to sequentially generate the next four end address data from the great circle ROM 40. These four data are shifted and weighted by the adder 41, and the resultant data is stored in the mapping memory 42.

When storage of the great circles for one point P in the mapping memory 42 is completed, the net point coordinates and weight are supplied through the bus BUS. The great circles are written in the mapping memory 42 in the same manner as described above.

When all the great circles for all points of interest are written in the mapping memory 42, the same storage contents as described with reference to FIG. 39 are obtained. Subsequently, the peak point is searched from the contents of the mapping memory 42. The peak point is detected as the intersection between the great circles.

For this reason, the contents of the mapping memory 42 are integrated to obtain the original level distribution as shown in FIGS. 33 and 34.

The switching circuit 49a is switched to an integrating register 49b to supply the contents of the integrating register 49b to the adder 48a. The contents of the mapping memory 42 are scanned along the Y- and X-axes and read out therefrom. The readout data is supplied to the latch circuit 48a and is added by the adder 48b to the contents of the integrating register 49b. The sum is stored in the corresponding memory area of the mapping memory 42 through the bus BUS and is also set in the integrating register 49b. When scanning of the mapping memory 42 is repeated along the X direction, the outputs from the adder 48b are integrated. In other words, the integration of weights of the end points, i.e., the original level distribution contents shown in FIGS. 46 and 47 are stored in the mapping memory 42.

In order to detect the peak point from the above level distribution, the output from the mapping memory 42 is sliced at a predetermined slice value. The slice value is set in the integrating register 49b.

Thereafter, the content of the mapping memory 42 are read out and latched by the latch circuit 48a through the bus BUS. The adder 48b adds the latched contents and the slice value. When the sum overflows, the adder 48b generates a carry signal. Otherwise, the adder 48b does not generate the carry signal. When the slice value is set so as not to generate a carry signal for a point excluding the peak point, the carry signal is not generated at a point excluding the peak point. Therefore, the carry signal is generated only at the peak point. In other words, slicing by addition is performed. An output from the adder 48b is stored at the immediately previous read address of the mapping memory 42 through the bus BUS, and the register 49b is not updated. When the above operation is performed for all addresses of the mapping memory 42, the data at the address corresponding to the peak point is set at logic "1" in the mapping memory, and the data at other addresses thereof are set at logic "0".

In this manner, the data "1" is stored for the peak point S in the mapping memory, and the data "0" are stored in other addresses thereof. By detecting the peak point S, the data extraction by mapping is completed.

In the above description, the mapping function having the allowance width and the suppression regions is generated and stored by the system (FIG. 45) for causing the suppression counter 49c to generate four end point address data. However, when the mapping function has only the allowance width and is generated by the system shown in FIG. 43, the ROM 40 is constituted by the ROM's 4000(1) and 4000(2) shown in FIG. 37, and the 4-bit suppression counter 49c is replaced with a 2-bit width counter, thereby generating and writing such a mapping function.

Example of Mapping Processor for Giving Bandwidth and Suppression Regions to Mapping Function FIGS. 49 to 52 show an example when the present invention is applied to the Hough transformation. The Hough transformation is used as a technique for condensing a probability when a line or a segment of the input image is to be extracted. As shown in the X-Y coordinate system of FIG. 49, a point P(X,Y) on the X-Y coordinate system is transformed to a point plotted on a sine wave plane in accordance with equation $r = X\sin\theta + Y\cos\theta$. In other words, the two-dimensional coordinates (X,Y) are mapped to polar coordinates $(r,\theta)$.

When sine waves corresponding to the respective points along one straight line on the X-Y coordinate system are plotted on the sine wave plane, these sine waves intersect with each other at two points thereon. When only the absolute value of r is considered, the two sine waves intersect with each other at one point. Since a rotational angle $\theta_0$ and a height $r_0$ of this point represent the rotational angle and the length of a vertical line when the vertical line is drawn from the origin to the straight line constituted by the points, the line data of the respective points can be extracted. In other words, extraction of a straight line or a line segment, or reproduction of a dotted line or a curve can be performed.

When a bandwidth SF is given to the sine waves as the mapping functions for one point, the intersection can be easily extracted. In addition, if the bandwidth SF and the suppression regions SFa and SFb are given to the sine waves, a steeper peak point can be obtained. Therefore, the peak point, i.e., the intersection, can be easily and accurately detected. The same mapping function generation as in spherical transformation can be used in the Hough transformation.

Figure 52:
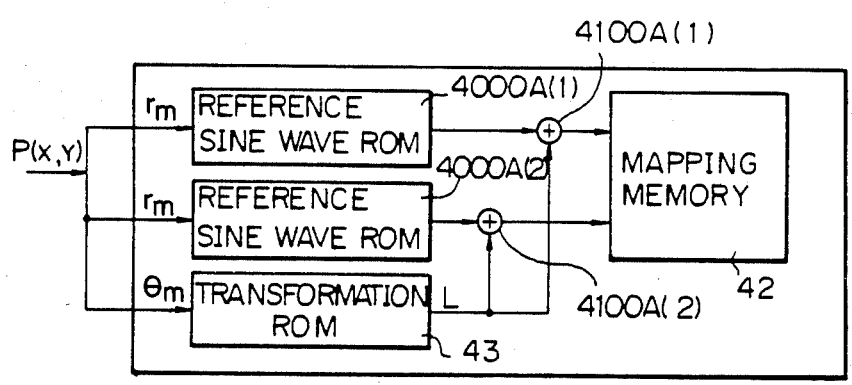

FIG. 52 is an example of a mapping processor wherein the present invention is applied to Hough transformation. Reference numerals 4000A(1) and 4000A(2) denote reference sine wave ROM's for storing coordinates of intersections between the reference sine wave and the concentric circles. The ROM 4000A(1) stores the reference sine wave representing the start point of the width region, and the ROM 4000A(2) stores the reference sine wave of the end point thereof. Reference numerals 4100A(1) and 4100A(2) denote adders; and 42, a mapping memory. The write addresses of the ROMs 4000A(1) and 4000A(2) are accessed in response to the outputs from the adders 4100A(1) and 4100A(2), respectively, thereby storing the sine wave patterns therein. The mapping processor shown in FIG. 52 is obtained by replacing the reference great circle ROM's with reference sine wave ROM's 4000A(1) and 4000A(2), respectively.

The operation of the mapping processor of FIG. 52 will be described hereinafter. The coordinates of the point (X,Y) are transformed into polar coordinates consisting of the circle $|r_m|$ and the phase $\theta_m$. The circle data $|r_m|$ is supplied to the reference sine wave ROM's 4000A(1) and 4000A(2) which generate reference sine wave patterns corresponding to the concentric circle radius $|r_m|$. The phase $\theta_m$ is supplied to the rotation ROM 43 which transforms the phase $\theta_m$ to the distance L. The adders 4100A(1) and 4100A(2) add the selected reference sine wave patterns and the distance L.

The reference sine wave patterns are shifted by the phase $\theta_m$ corresponding to the distance L, thereby obtaining the reference wave patterns corresponding to the point P. The outputs from the adders 4100A(1) and 4100A(2) are used as the write addresses, thereby storing the sine waves corresponding to the point P in the mapping memory 42. The sine waves of the respective points are stored in the reference sine wave ROM 4000A in accordance with the reference sine waves.

The intersection extraction can be performed in the same manner as described above.

The structure and operation of the mapping processor of FIG. 52 are the same as those illustrated in FIGS. 30 to 37. A modification may be made on the basis of FIGS. 38 to 40. As shown in FIG. 45, four reference sine wave ROM's are provided as the reference mapping function ROM. End point recording can also be applied to the mapping processor of FIG. 52.

Supplemental Explanation of Mapping Processor

Figure 53B:
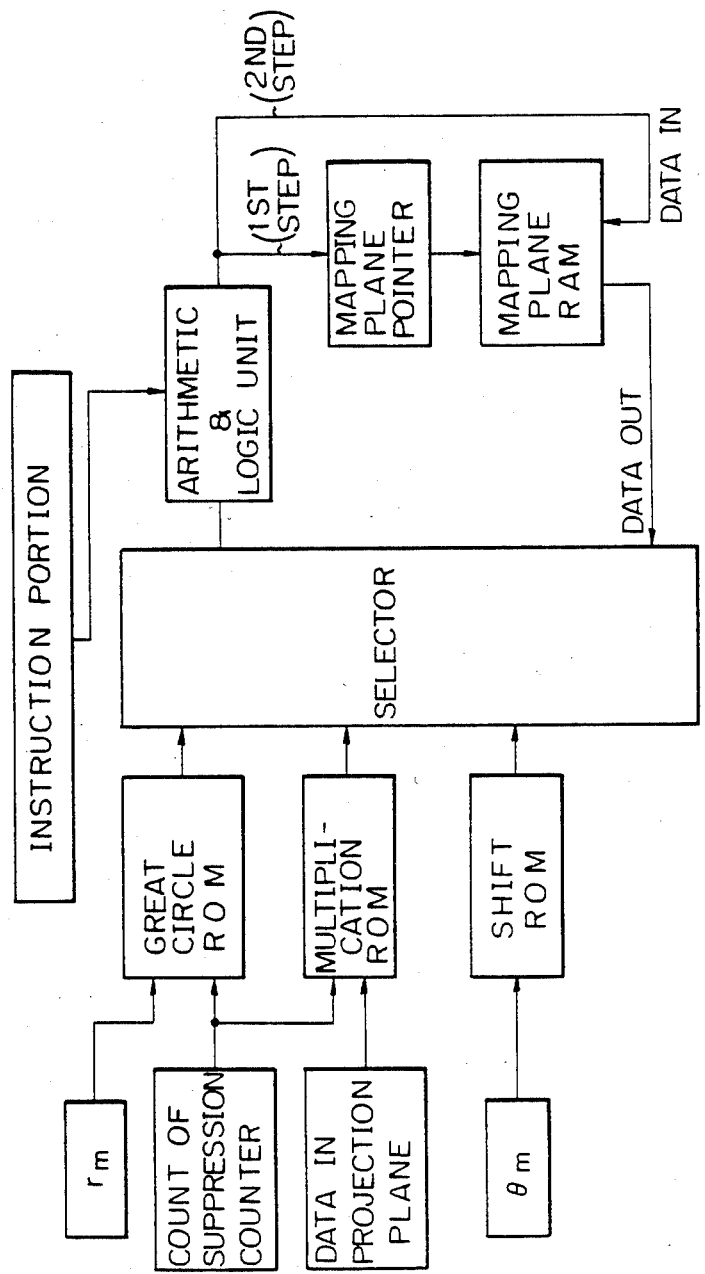
FIGS. 53a and b and 54a and b are schematic diagrams for explaining an example of the structure of a mapping processor.
Figure 54A:
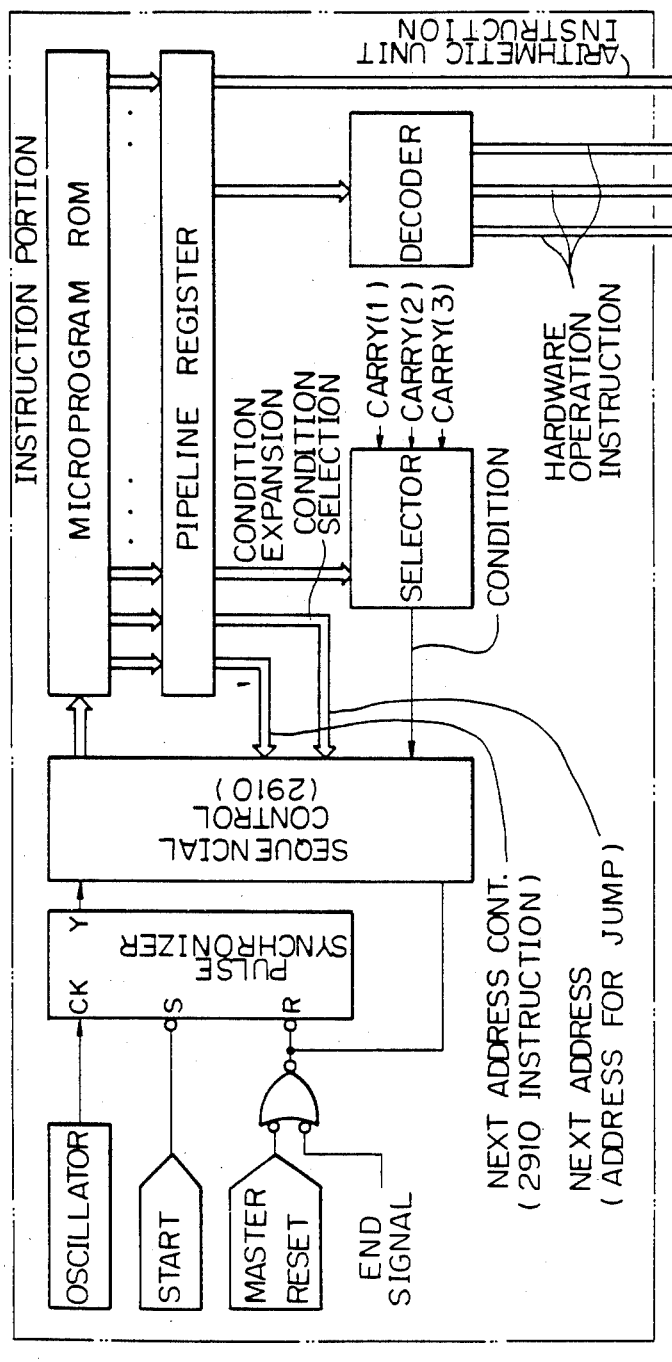
Figure 54B:
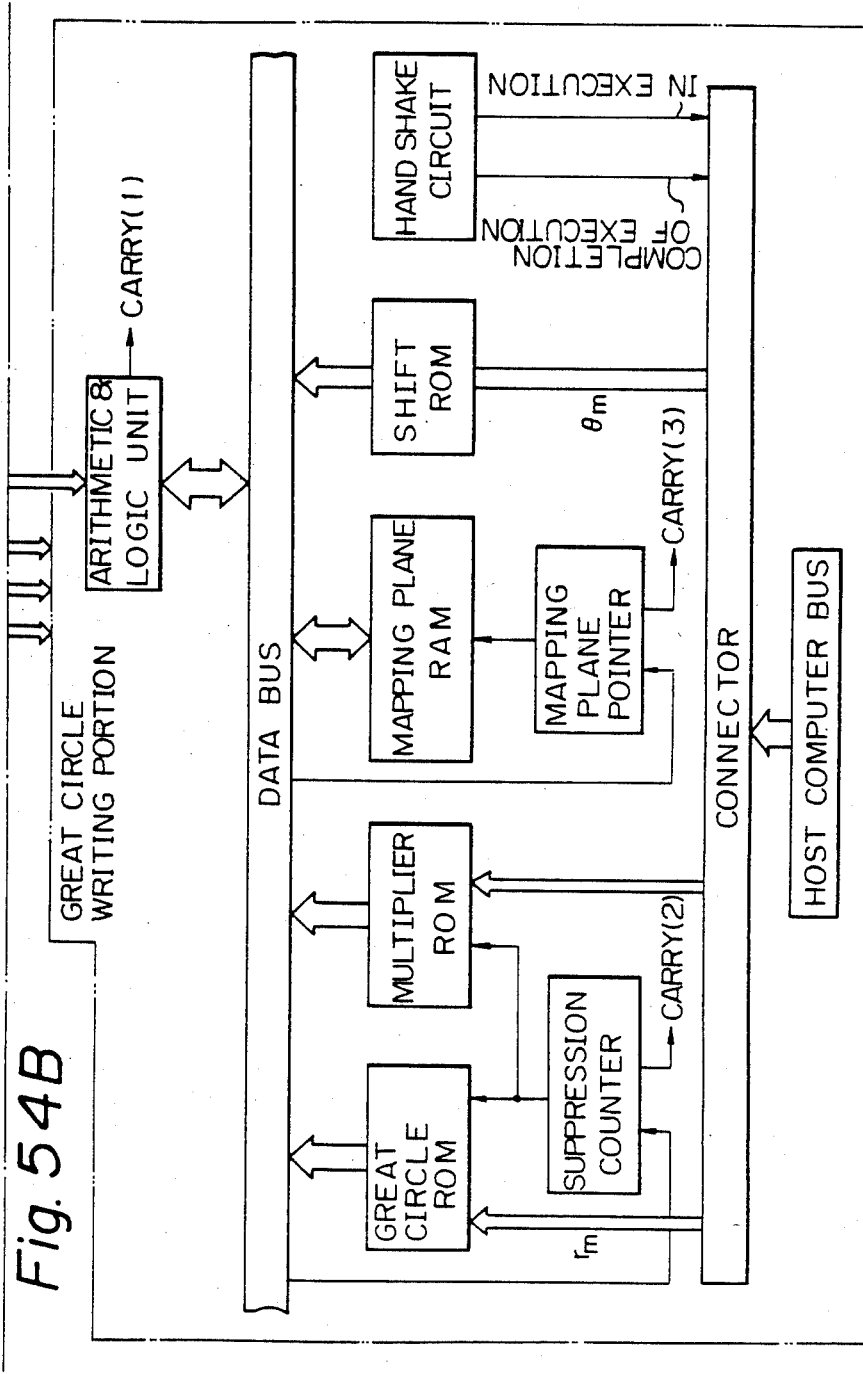
Figure 55:
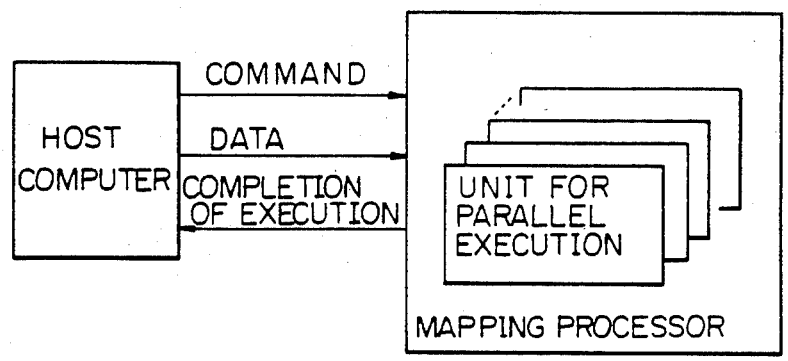
FIG. 55 illustrates the sequence of the execution of the programs for the example of a mapping processor.
Figure 56:
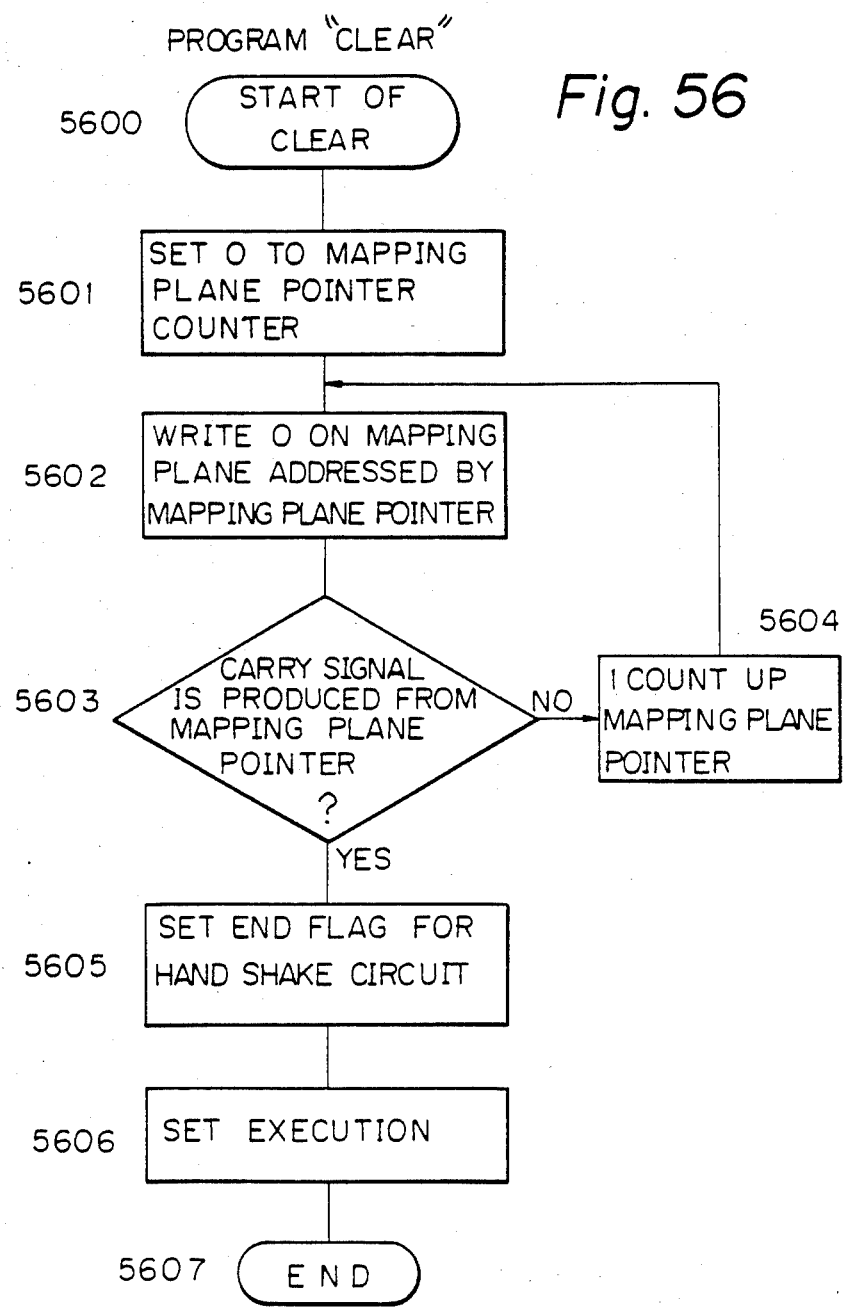
FIGS. 56, 57, and 58 are flow charts of the operation of the example of a mapping processor.
Figure 57:
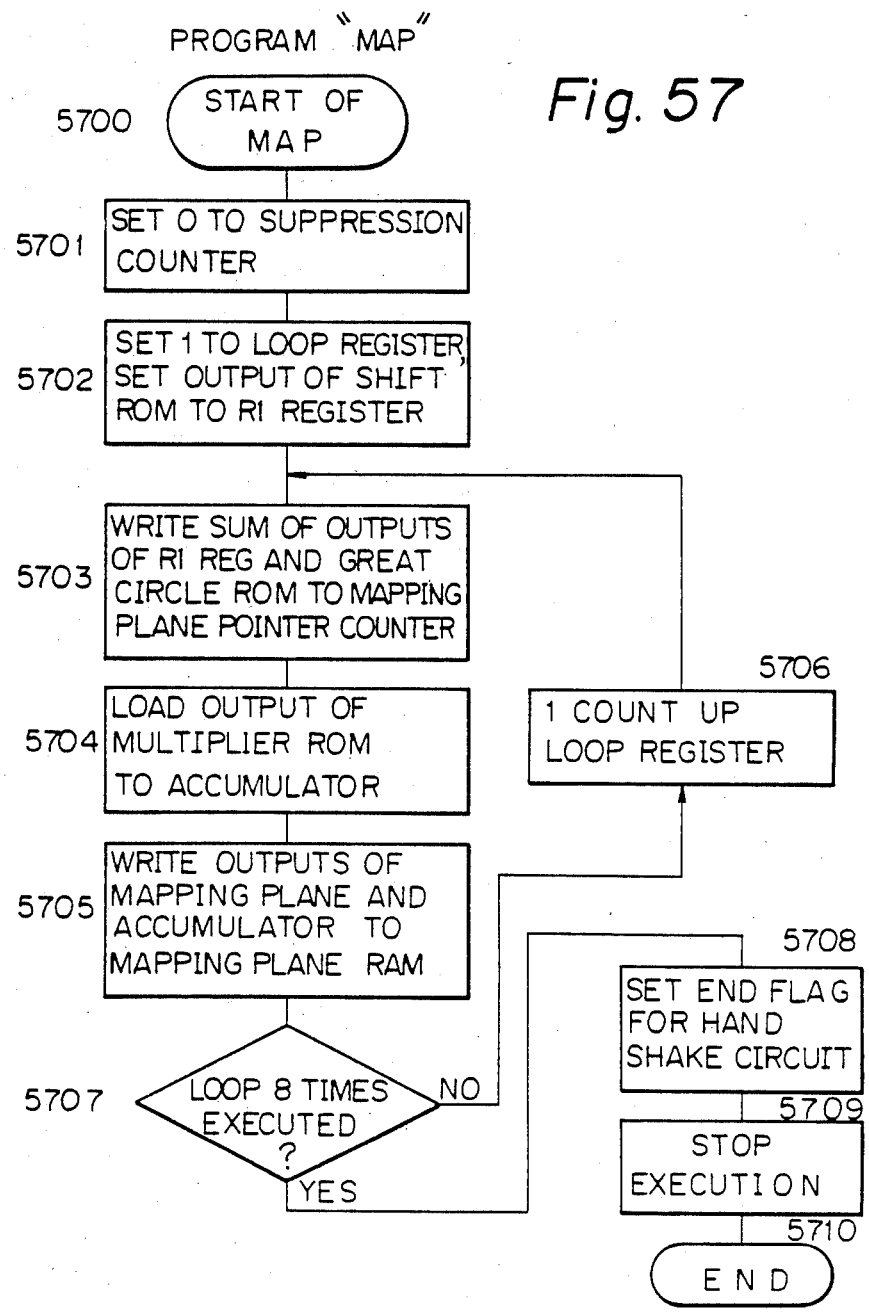
Figure 58:
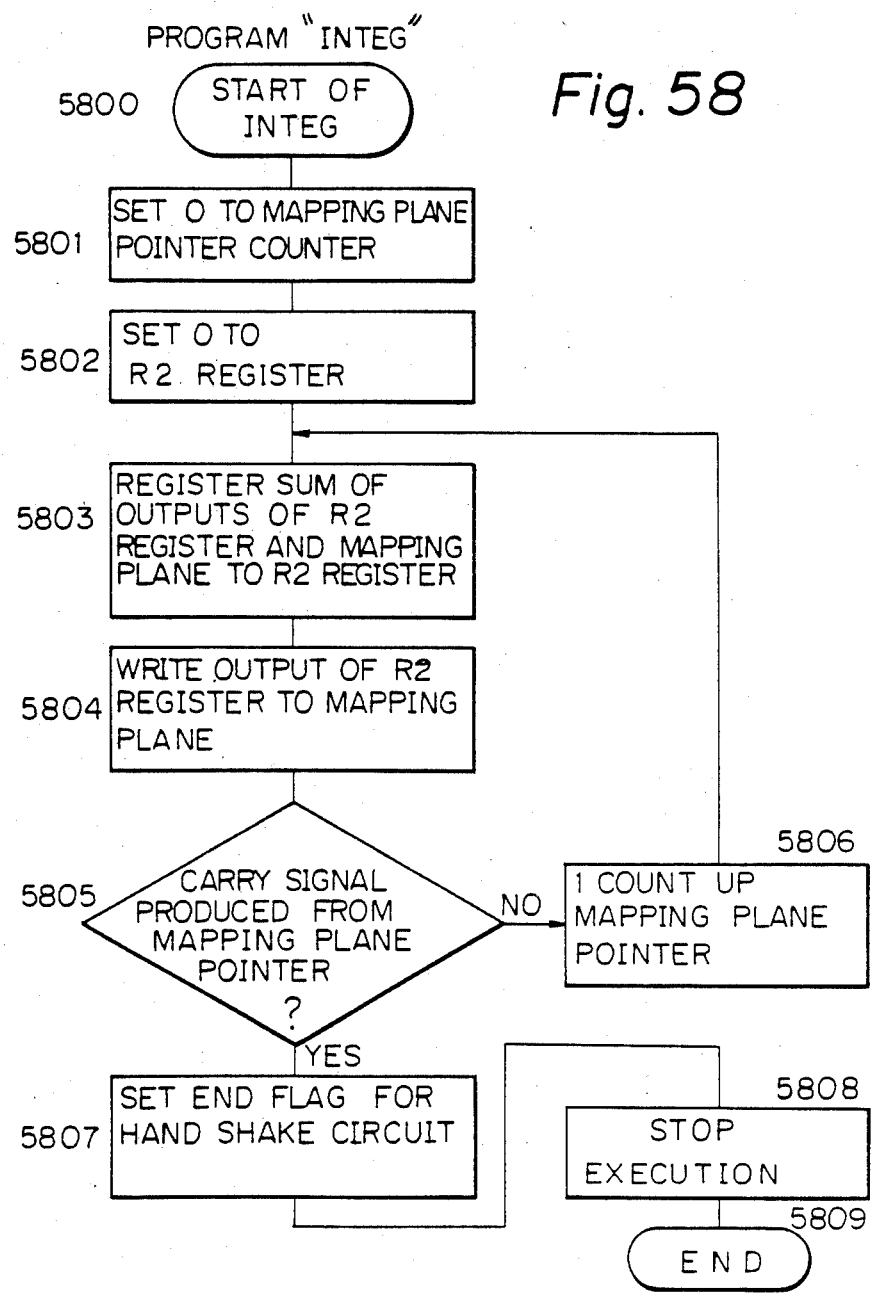

An example of the structure and the operation of the mapping processor shown in FIG. 48 is further explained with reference to FIGS. 53 to 58. In FIGS. 53 and 54, schematic diagrams for explaining the structure of the mapping processor are shown. In FIG. 55, the sequence of the execution of the programs is illustrated. In FIGS. 56, 57, and 58, flow charts of the operation of the mapping processor are shown.

In FIG. 53, the system for the writing of great circles is illustrated. The mapping plane address is supplied to the mapping plane in a first step. In the multiplier, the multiplication of the original data by the differentiation data is carried out. The result of the addition of the output of the multiplier to the data read from the mapping plane is written into the mapping plane in a second step.

The combination of the great circle writing portion and the instruction portion thereof is illustrated in FIG. 54. The instruction portion includes a pulse synchronizer, a sequential control circuit, a microprogram ROM, a pipeline register, and a decoder. The great circle writing portion includes an arithmetic and logic unit, a data bus, a great circle ROM, a multiplier ROM, a mapping plane ROM, a shift ROM, a hand shake circuit, and a connector.

The execution of the programs by the mapping processor under the control of the host computer is illustrated in FIG. 55. A sequence of a program "CLEAR", a program "MAP", and a program "INTEG" is illustrated. The flow charts of the execution of the program "CLEAR", the program "MAP", and the program "INTEG" are shown in FIGS. 56, 57, and 58.

We claim:

1. An information extraction computer device for extracing information from a picture by mapping, comprising:

converting means for detecting points in a picture on a spherical surface by physically detecting the points, determining coordinates of the points and storing the coordinates;

mapping means for mapping, according to a polar transformation mapping function, the points in the picture into great circles on the spherical surface, each of said great circle being defined by an intersection between the spherical surface and a mapping plane which is perpendicular to a radius connecting a center of a sphere defined by the spherical surface and the respective point on the spherical surface, and which mapping plane includes the center of the sphere; and information extraction computation means for extracting information from the picture on the spherical surface on the basis of mapping function data of coordinate values of the points obtained by said mapping means.

2. An information extraction device according to claim 1, wherein writing of the mapping function of said data into a respective mapping plane is carried out in the form of writing of the mapping to have a bandwidth.

3. An information extraction device according to claim 2, wherein said writing is carried out in the form of writing into addresses of a memory in correspondence to end points of said bandwidth.

4. An information extraction device according to claim 3, wherein differentiation values are written into the addresses of said end points of said bandwidth.

5. A device according to claim 1, further comprising a coordinate transformation means for transforming coordinate values of points on a given plane to the coordinate values of said points on said spherical surface, wherein said transforming of said coordinate values of said points in said given plane is in correspondance to said points on said given plane.

6. A device according to claim 5, wherein said coordinate transformation means includes a camera positioned at the center of the sphere.

7. A device according to claim 6, wherein the picture information extraction is carried out by a translational movement of the camera.

8. A device according to claim 7, wherein a measurement of a three-dimensional direction of a straight line, parallel lines, or a plane in space is carried out by said translational movement of the camera.

9. A device according to claim 6, wherein a detection of parallel lines in space and a measurement of the three-dimensional direction of a straight line or a plane in space with regard to said parallel lines or carried out by a camera positioned at a fixed position.

10. An information extraction method for extracting information from a picture by mapping using a computer, comprising the steps of:

converting points in a picture on a spherical surface into coordinates by physically detecting the points and storing coordinates of the points;

mapping, according to a mapping polar transformation function, the points in the picture to great circles on the spherical surface, each of said great circles being defined by an intersection between the spherical surface and a plane which is perpendicular to a radius connecting a center of a sphere defined by the spherical surface and a point on the spherical surface and includes the center of the sphere; and extracting information from the picture on the spherical surface on the basis of mapping function data of coordinates of points obtained by said mapping step.

11. A method according to claim 10, further comprising the step of transforming the coordinate values of points on a given plane to the coordinate values of the points on a spherical surface corresponding to the points on the given plane.

12. An information extraction computer device for extracting information from a picture by mapping, comprising:
mapping means for mapping, according to a mapping function, points on a spherical surface in correspondence to great circles, each of said great circles being defined by an intersection between the spherical surface and a plane which is perpendicular to a radius connecting the center of the spherical surface and the respective point on the spherical surface, and which plane include the center of the spherical surface,
great circle mapping means for mapping each said great circle to a respective point on said spherical surface; and
information extraction means for extracting information contained in said points in said mapping plane, corresponding to said great circles on the basis of said mapping function.

13. An information extraction method for extracting information from a picture on a spherical surface by mapping using a computer, comprising the steps of:
setting reference points in the picture;
obtaining and storing mapping function data, corresponding to the set reference points, in a respective mapping plane;
obtaining data of relative positions of points of said picture with respect to the reference points;
shifting said mapping function data of the set reference points in said respective mapping plane based on said relative position data of said points;
obtaining the respective mapping function data of said points in the picture from the result of said shifting; and
extracting information contained in each of said points in said mapping plane on the basis of the mutual relationship between mapping functions.

14. A method according to claim 13, wherein the coordinate values of each of the points of said picture are expressed in a polar coordinate system, each of the reference points is set with regard to a corresponding concentric circle of said polar coordinate system, and said mapping function data of the reference points is stored in a memory.

15. A method according to claim 14, wherein said mapping function data of the coordinate values of each of the points in the plane are expressed by a radial position of the respective concentric circle and the respective rotational position of the respective point along said concentric circle, the corresponding mapping function is selected by the position of the concentric circle, and said mapping function data of each of the points is obtained by shifting the selected mapping function on the basis of the rotational position of the point.

16. A method according to claim 15, wherein the shifting of each mapping function is carried out after a transformation of the rotational position of the respective point to a respective distance from the reference point along the concentric circle.

17. A method according to claim 14, wherein the mapping function is stored for each of the concentric circles.

18. A method according to claim 17, wherein the mappng plane is arranged separately for each of the concentric circles, each said mapping function is obtained in parallel for each of the concentric circles, the shifting of each said mapping function is carried out, and each shifted mapping function is stored in the mapping plane for each of the concentric circles.

19. A method according to claim 17, wherein coordinate values of the intersection of each mapping function and each of the concentric circles are stored in a memory as the respective mapping function.

20. A method according to claim 14, wherein the mapping function comprises spherical mapping with regard to a mapping plane as a sphere, and the mapping plane is divided by concentric circles at respective latitudes.

21. A method according to claim 20, wherein each said mapping function is a respective great circle with respect to the point as the pole on the surface of said sphere, each said great circle being the equator with respect to the point as the pole, thereby providing a respective polar reciprocity transformation.

22. A method according to claim 14, wherein the mapping function is a Hough transformation with regard to the mapping plane as a respective Hough transformation plane.

23. A method according to claim 22, wherein the mapping function is a Hough transformation function.

24. An information extraction computer device for extracting information from a picture by mapping, comprising:
mapping means for mapping, according to a mapping function, points on a spherical surface in correspondence to great circles, each of said great circles being defined by an intersection between the spherical surface and a plane which is perpendicular to a radius connecting a center of the spherical surface and the respective point on the spherical surface, and which mapping plane includes the center of the spherical surface; and writing of a mapping function into the mapping plane is carried out by writing a mapping function have a bandwidth and differentiation values into addresses at endpoints of said bandwidth, the differentiation values written into the mapping plane are integrated, and said integrated value is again written into the mapping plane; and
information extraction means for extracting information contained in said points in said mapping plane, corresponding to said great circles on the basis of the mapping function.

25. An information extraction device according to claim 24, wherein said writing of each said mapping function into the mapping plane is carried out in the form of the writing of each mapping function with a respective bandwidth and respective suppression regions on both sides of each bandwidth.

26. An information extraction device according to claim 25, wherein the writing of each said mapping function with the bandwidth and the suppression regions is carried out in the form of writing into the addresses of the end points of said bandwidth and suppression regions.

27. An information extraction device according to claim 26, wherein respective differentiation values are written into the addresses of said end points of said bandwidth and suppression regions.

28. An information extraction device according to claim 27, wherein the differentiation values written into the mapping plane are integrated, and each said integrated value is again written into the mapping plane.

* * * * *

UNITED STATES PATENT AND TRADEMARK OFFICE
CERTIFICATE OF CORRECTION

PATENT NO. : 4,736,436

DATED : April 5, 1988

INVENTOR(S) : Yasukawa et al.

It is certified that error appears in the above-identified patent and that said Letters Patent is hereby corrected as shown below:

Column 2, line 62, "8" should be --8 illustrate--.

Column 3, line 1, "10" should be --10a, 10b--;

line 1, "13a13b" should be --13a, 13b--;

line 41, "b" (first occurrence) should be --53b--;

line 41, "b" (second occurrence) should be --54b--.

Column 5, line 22, "$P40_1$," should be --$P'_1$,--.

Column 8, line 52, "stores. The" should be --stores the--.

Column 9, line 58, "utilises" should be --utilizes--.

Column 10, line 22, "47 a" should be --47a--.

UNITED STATES PATENT AND TRADEMARK OFFICE
CERTIFICATE OF CORRECTION

PATENT NO. : 4,736,436

DATED : April 5, 1988

INVENTOR(S) : Yasukawa et al.

It is certified that error appears in the above-identified patent and that said Letters Patent is hereby corrected as shown below:

Column 12, line 26, after "Mapping" insert --Processor is--.

Column 13, line 65, delete "in".

Column 17, line 17, "storage" should be --Storage--.

Column 22, line 45, "(/2)" should be --(W/2)--.

Column 25, line 44, "an" should be --and--;

line 46, before "-3/2," insert --3/2,--.

Column 30, line 8, "circle" should be --circles--.

Column 31, line 19, "include" should be --includes--.

Column 30, line 23, "the mapping" should be --the mapping function--.

Signed and Sealed this

First Day of November, 1988

Attest:

DONALD J. QUIGG

*Attesting Officer*      *Commissioner of Patents and Trademarks*

UNITED STATES PATENT AND TRADEMARK OFFICE
CERTIFICATE OF CORRECTION

PATENT NO.  : 4,736,436

DATED       : April 5, 1988

INVENTOR(S) : Yasukawa et al.

It is certified that error appears in the above-identified patent and that said Letters Patent is hereby corrected as shown below:

Column 30, line 52, "or" should be --are--.

Signed and Sealed this

First Day of August, 1989

Attest:

DONALD J. QUIGG

*Attesting Officer*    *Commissioner of Patents and Trademarks*